US010649760B2

(12) United States Patent
Shimohata et al.

(10) Patent No.: US 10,649,760 B2
(45) Date of Patent: May 12, 2020

(54) UPDATING A FIRMWARE FROM A SERVER IN RESPONSE TO A REQUEST FROM AN EXECUTING APPLICANT PROGRAM

(71) Applicant: NINTENDO CO., LTD., Kyoto-shi, Kyoto (JP)

(72) Inventors: Yasuyuki Shimohata, Kyoto (JP); Naoki Hatta, Kyoto (JP); Yoshihiro Tomizawa, Kyoto (JP); Masaaki Sugino, Kyoto (JP); Ryota Oiwa, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 16/003,439

(22) Filed: Jun. 8, 2018

(65) Prior Publication Data
US 2018/0365001 A1   Dec. 20, 2018

(30) Foreign Application Priority Data

Jun. 19, 2017   (JP) .................................. 2017-119790

(51) Int. Cl.
G06F 13/10   (2006.01)
G06F 8/65   (2018.01)
G06F 9/54   (2006.01)

(52) U.S. Cl.
CPC ................ *G06F 8/65* (2013.01); *G06F 9/543* (2013.01); *G06F 13/10* (2013.01)

(58) Field of Classification Search
None
See application file for complete search history.

(56) References Cited

U.S. PATENT DOCUMENTS

2003/0217257 A1   11/2003   Ebsen et al.
2011/0055821 A1*   3/2011   Tanaka ...................... G06F 8/65
                                                                      717/170
2012/0096451 A1   4/2012   Tenbarge et al.
(Continued)

FOREIGN PATENT DOCUMENTS

JP    2016-001391        1/2016
WO   WO 99/42924 A1     8/1999
WO   WO 2016/163429 A1  10/2016

OTHER PUBLICATIONS

Ciprian Adrian Rusen, "How to Update the Firmware on Your Xbox One Controller Headset", [https://www.digitalcitizen.life/users/ciprian-adrian-rusen] published on Mar. 13, 2014 (5 pgs.).

*Primary Examiner* — Daxin Wu
(74) *Attorney, Agent, or Firm* — Nixon & Vanderhye, P.C.

(57) ABSTRACT

An information processing apparatus to which an input apparatus is connected through a wire or wirelessly is provided. The information processing apparatus includes a memory and a processor coupled to the memory. The processor executes an application program in accordance with an operation by a user accepted by the input apparatus, obtains update data for firmware of the input apparatus from a server through a network, and performs processing for updating the firmware of the input apparatus in response to a request from the application program while the application program is being executed. The processor suspends execution of the application program before update of the firmware and resumes execution of the application program in response to completion of update of the firmware.

20 Claims, 15 Drawing Sheets

(56) References Cited

U.S. PATENT DOCUMENTS

| | | | |
|---|---|---|---|
| 2012/0180034 A1* | 7/2012 | Hatamoto | G06F 8/65 717/168 |
| 2013/0318519 A1* | 11/2013 | Coolidge | G06F 8/65 717/173 |
| 2015/0363188 A1 | 12/2015 | Tsuchiya | |
| 2017/0039372 A1* | 2/2017 | Koval | G01D 4/004 |
| 2017/0286085 A1* | 10/2017 | Steshenko | G06F 8/44 |
| 2018/0039491 A1 | 2/2018 | Bamba et al. | |

* cited by examiner

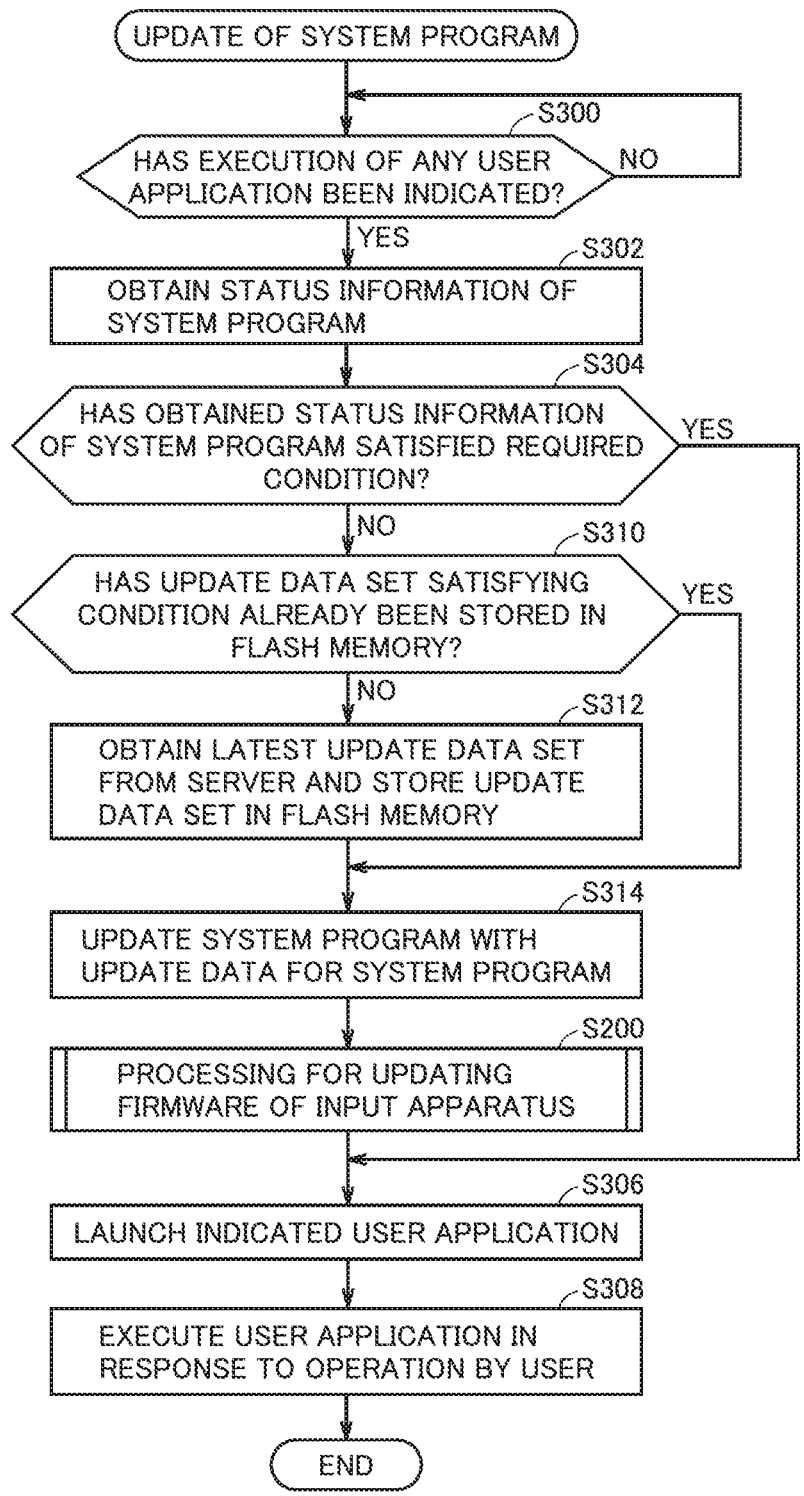

UPDATING A FIRMWARE FROM A SERVER IN RESPONSE TO A REQUEST FROM AN EXECUTING APPLICANT PROGRAM

This nonprovisional application is based on Japanese Patent Application No. 2017-119790 filed on Jun. 19, 2017 with the Japan Patent Office, the entire contents of which are hereby incorporated by reference.

FIELD

The present technique relates to an information processing apparatus storing updatable firmware thereon, an information processing system, an information processing method, and a non-transitory computer-readable storage medium with an executable information processing program stored thereon.

BACKGROUND AND SUMMARY

In general, software executed in various information processing apparatuses can be updated as necessary. For example, a configuration for realizing an environment in which software can efficiently be updated has been known. More specifically, an information processing apparatus is disclosed, with which a notification that a terminal device is ready for update of software is communicated to a user and an instruction to update the software is transmitted in response to acknowledgement by the user.

An information processing apparatus to which one input apparatus is connected or a plurality of input apparatuses are connected through a wire or wirelessly is assumed. Even though update of software is ready, updating is not always performed. For example, an input apparatus which has not established connection when update was ready, an input apparatus in which a state of charge of a battery has not been sufficient when update was ready, and an input apparatus newly purchased after update was ready are not subjected to update.

In such a case, a user has to perform update again by operating a menu for the input apparatus of which software was not updated, and usability may have been lowered. One object of the present technique is to solve the problem as described above.

An exemplary embodiment provides an information processing apparatus to which an input apparatus is connected through a wire or wirelessly. The information processing apparatus includes a memory and a processor coupled to the memory. The processor executes an application program in accordance with an operation by a user accepted by the input apparatus. The processor obtains update data for firmware of the input apparatus from a server through a network. The processor performs processing for updating the firmware of the input apparatus in response to a request from the application program while the application program is being executed. The processor suspends execution of the application program before update of the firmware and resumes execution of the application program in response to completion of update of the firmware.

According to this embodiment, when an input apparatus is used together with the information processing apparatus, firmware is updated as necessary by an executed application. Therefore, the user does not have to manually update the firmware. Therefore, from a point of view of the user, time and efforts for management of a version of the firmware for such a peripheral device as an input apparatus other than the information processing apparatus can be reduced.

According to this embodiment, execution of the application program is suspended before update of the firmware of the input apparatus and suspended execution of the application program is resumed after update of the firmware of the input apparatus. Therefore, from a point of view of the user, it is not necessary to quit the application program which is being executed in order to update the firmware of the input apparatus and inconvenience involved with update of the firmware is not caused.

The processor may perform processing for updating the firmware of the input apparatus when the input apparatus does not satisfy a condition necessary for execution of the application program. By adopting such a configuration, processing for updating the firmware of the input apparatus can be prevented from being performed each time the application program is executed, and processing for updating the firmware of the input apparatus can be performed only when it is necessary.

The processor may obtain version information of the firmware of the input apparatus in response to a request from the application program. By adopting such a configuration, processing for updating the firmware of the input apparatus can reasonably be performed in accordance with conditions required for the input apparatus which are different depending on a content of an application to be executed.

The processor may determine whether or not the version information of the firmware of the input apparatus satisfies a condition required by the application program. By adopting such a configuration, whether or not a required condition is satisfied can be determined based on a common criterion of version information, and processing for determining whether or not update is necessary can be simplified.

The information processing apparatus may further include an application programming interface (API) which gives a response about the version information of the firmware of the input apparatus. By adopting such a configuration, each of applications executed in the information processing apparatus can obtain version information of the firmware of the input apparatus by calling an API in common, and whether or not an environment of execution is appropriate can be determined based on the obtained version information.

The processor may obtain update data for the firmware of the input apparatus together with update data for a system program of the information processing apparatus. By adopting such a configuration, management of the version can be easier than in an example in which update data is individually obtained.

The processor may perform also processing for updating the firmware of the input apparatus connected to the information processing apparatus when processing for updating the system program of the information processing apparatus is performed. By adopting such a configuration, the firmware of the input apparatus which has not been updated for some reason can be updated.

The processor may obtain version information of the system program of the information processing apparatus in response to execution of the application program, and when the version information of the system program of the information processing apparatus does not satisfy a condition necessary for execution of the application program, the processor may perform processing for updating the system program of the information processing apparatus. By adopting such a configuration, processing for updating the system program of the information processing apparatus can reasonably be performed in accordance with conditions which are different depending on a content of an application to be executed.

The information processing apparatus may further include a wireless communication unit which wirelessly communicates with another information processing apparatus. When the information processing apparatus is not wirelessly communicating with another information processing apparatus, the processor may perform processing for updating the firmware. By adopting such a configuration, in updating the firmware of the input apparatus, the possibility of failure in update can be lowered. The firmware of the input apparatus can thus more reliably be updated.

When a state of charge of a battery of the information processing apparatus satisfies a predetermined condition and when a state of charge of a battery of the input apparatus satisfies a predetermined condition, the processor may perform processing for updating the firmware of the input apparatus. By adopting such a configuration, the possibility of failure in update can be lowered in each of the information processing apparatus and the input apparatus so that the firmware of the input apparatus can more reliably be updated.

A plurality of input apparatuses may be connectable to the information processing apparatus through a wire or wirelessly. The processor may perform processing for updating the firmware of the input apparatus used with the application program and perform processing for updating also firmware of another input apparatus connected to the information processing apparatus independently of whether or not the firmware is used with the application program. By adopting such a configuration, the firmware of all input apparatuses connected to the information processing apparatus can collectively be updated.

The processor may execute an application program for a game as the application program. Though game application programs may significantly be different from one another in required condition depending on a content of the games, such a request can also be met by adopting the configuration.

An exemplary embodiment provides an information processing system that includes an input apparatus and an information processing apparatus to which the input apparatus is connected through a wire or wirelessly. The information processing apparatus includes a memory and a processor coupled to the memory. The processor executes an application program in accordance with an operation by a user accepted by the input apparatus. The processor obtains update data for firmware of the input apparatus from a server through a network. The processor performs processing for updating the firmware of the input apparatus in response to a request from the application program while the application program is being executed. The processor suspends execution of the application program before update of the firmware and resumes execution of the application program in response to completion of update of the firmware. According to this configuration, advantages similar to those of the information processing apparatus described above are obtained.

An exemplary embodiment provides an information processing method performed in an information processing apparatus to which an input apparatus is connected through a wire or wirelessly. The information processing method includes executing an application program in accordance with an operation by a user accepted by the input apparatus, obtaining update data for firmware of the input apparatus from a server through a network, performing processing for updating the firmware of the input apparatus in response to a request from the application program while the application program is being executed, suspending execution of the application program before update of the firmware of the input apparatus, and resuming execution of the application program in response to completion of update of the firmware of the input apparatus. According to this configuration, advantages similar to those of the information processing apparatus described above are obtained.

An exemplary embodiment provides a non-transitory computer-readable storage medium with an executable information processing program stored thereon, the information processing program being executed by a computer to which an input apparatus is connected through a wire or wirelessly. The information processing program causes the computer to perform obtaining update data for firmware of the input apparatus from a server through a network, performing processing for updating the firmware of the input apparatus in response to a request from an application program while the application program is being executed in accordance with an operation by a user accepted by the input apparatus, suspending execution of the application program before update of the firmware of the input apparatus, and resuming execution of the application program in response to completion of update of the firmware of the input apparatus. According to this configuration, advantages similar to those of the information processing apparatus described above are obtained.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 12 shows an exemplary illustrative non-limiting flowchart illustrating a processing procedure when the main body apparatus according to the present embodiment updates a system program.

DETAILED DESCRIPTION OF NON-LIMITING EXAMPLE EMBODIMENTS

Figure 1:
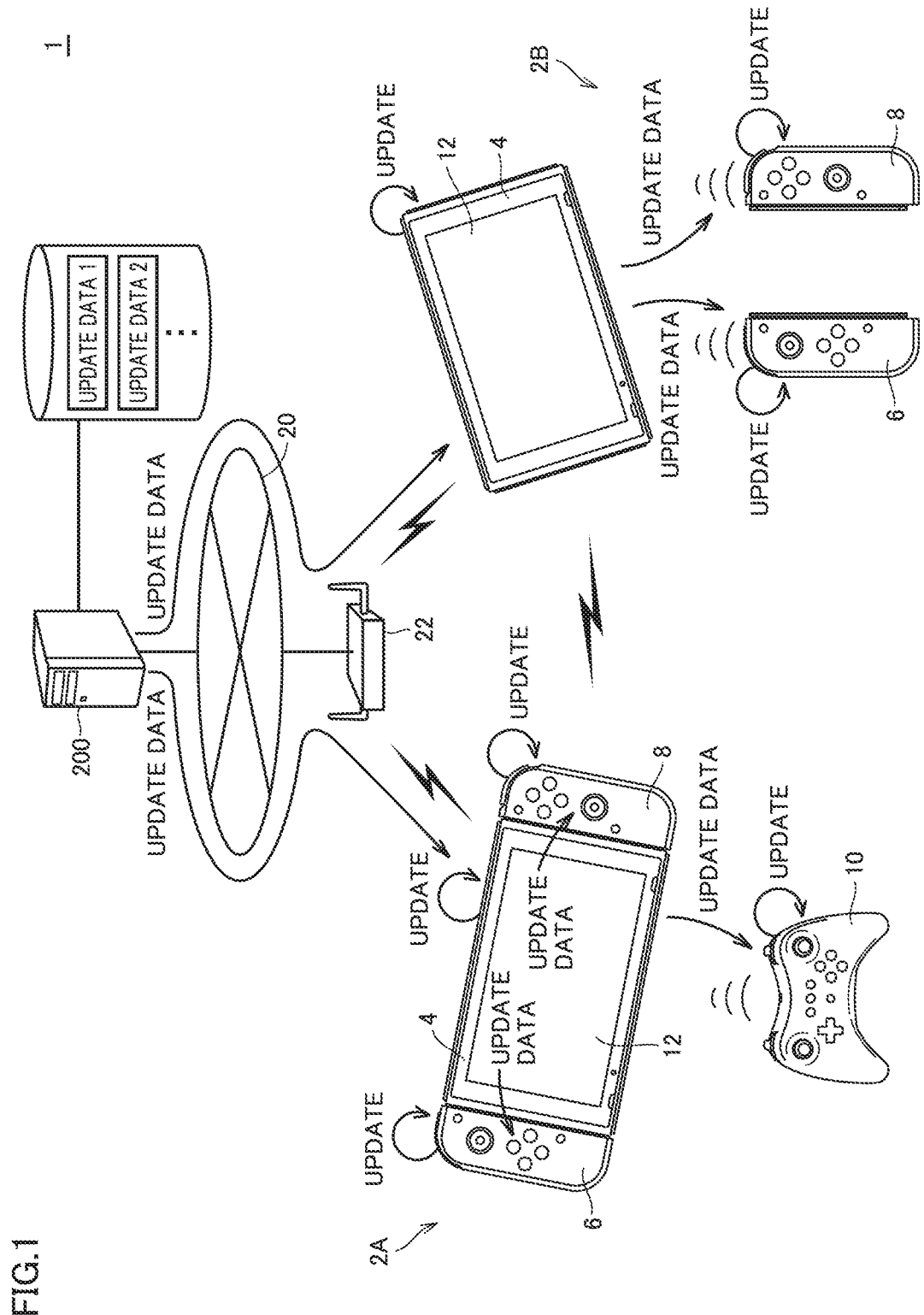
FIG. 1 shows an exemplary illustrative non-limiting drawing illustrating a schematic diagram of an overall configuration of a system according to the present embodiment.

The present embodiment will be described in detail with reference to the drawings. The same or corresponding elements in the drawings have the same reference characters allotted and description thereof will not be repeated.

A. SYSTEM CONFIGURATION

An overall configuration of a system including an information processing apparatus according to the present embodiment will initially be described. Referring to FIG. 1, a system 1 includes one game device 2 or a plurality of game devices 2 and a server 200.

Though a game device (a dedicated game machine) will be described as an information processing apparatus by way of example in the description below, limitation thereto is not intended, and for example, any information processing apparatus which can execute a game such as a personal computer, a smartphone, a tablet, a portable telephone, and other smart devices is applicable.

Though FIG. 1 exemplifies two game devices 2A and 2B for the sake of convenience of description, system 1 may consist of a single game device 2 or may include more game devices 2.

One input apparatus is connected or a plurality of input apparatuses are connected to each game device 2 through a wire or wirelessly. In the example shown in FIG. 1, game device 2 includes a main body apparatus 4, a left controller 6, and a right controller 8. Main body apparatus 4 represents one type of a computer and includes a display 12 representing one example of a display.

Main body apparatus 4 corresponds to one example of the information processing apparatus and left controller 6 and right controller 8 correspond to examples of the input apparatus. Game device 2 including main body apparatus 4 and left controller 6 and/or right controller 8 as being combined can also be regarded as an information processing system.

Left controller 6 and right controller 8 accept an operation by a user and transmit information indicating the accepted operation by the user to main body apparatus 4. Data may be transmitted from main body apparatus 4 to left controller 6 and right controller 8.

In game device 2A shown in FIG. 1, left controller 6 and right controller 8 are attached to main body apparatus 4 (which is also referred to as an "attached state" below). In the attached state, basically, connection between main body apparatus 4 and left controller 6 and between main body apparatus 4 and right controller 8 is established through a wire.

In game device 2B, left controller 6 and right controller 8 are detached from main body apparatus 4 (which is also referred to as a "detached state" below). In the detached state, connection between main body apparatus 4 and left controller 6 and between main body apparatus 4 and right controller 8 is wirelessly established.

An accessory controller 10 as a different input apparatus may be connected to main body apparatus 4 through a wire or wirelessly. FIG. 1 shows an example in which accessory controller 10 is wirelessly connected to main body apparatus 4.

Main body apparatus 4 executes a system program and various application programs in response to an operation by a user onto any of left controller 6, right controller 8, and accessory controller 10 which represent input apparatuses. Typically, main body apparatus 4 executes an application program for a game as the application program.

Communication may be established between main body apparatus 4 of game device 2 and main body apparatus 4 of another game device 2. For example, main body apparatus 4 of game device 2A and main body apparatus 4 of game device 2B may wirelessly be connected to each other. Such connection between main body apparatuses 4 is also referred to as "local communication." Such local communication is effective for a match game or a game played by a plurality of players.

Each main body apparatus 4 can further access to server 200 through a network 20. Though FIG. 1 shows a configuration in which access to server 200 is made through an access point 22 connected to network 20, limitation thereto is not intended and any form of connection can be adopted. For example, main body apparatus 4 and server 200 may be connected to each other through a wire or through mobile communication such as long term evolution (LTE) or WiMAX.

Server 200 holds one program or a plurality of programs in such a manner that the program or the programs can be downloaded therefrom, and it provides a program of interest to main body apparatus 4 in response to a request from main body apparatus 4 or in response to a predetermined condition being satisfied. Each main body apparatus 4 can download any program from server 200. Alternatively, server 200 may transmit by pushing any program to any main body apparatus 4.

In the description below, by way of example, a configuration in which server 200 provides data for updating a program to be used in main body apparatus 4 (which is referred to as "update data" below) will be described. A method of updating a program includes a form of providing only a difference between a current program code and an updated program code and a form of providing the entire updated program code. The term "update data" herein encompasses any data necessary for updating a program regardless of a form of update.

In the description below, a system program providing a basic function of main body apparatus 4 (which is executed in main body apparatus 4) and firmware of an input apparatus (left controller 6, right controller 8, and accessory controller 10) are assumed as examples of programs to be used and updated in main body apparatus 4. Any program can be updated without being limited to the system program and the firmware of the input apparatus.

The term "firmware" herein is a concept encompassing a program for controlling hardware components constituting the input apparatus, and the firmware is not limited to a specific form of codes. For example, the "firmware" may be codes described in an assembly language, a program such as Basic Input/Output System (BIOS), or a program described in a higher-level language.

The term "application program" herein is a concept encompassing program codes executed by a processor of an information processing apparatus and distinguished from "firmware". The "application program" may broadly include a "user application program" (which is also abbreviated as a "user application" below) and a "system application program" (which is also abbreviated as a "system program" below).

The "user application" is a concept encompassing an individually executed program such as a game application or a setting application. The "system program" is a concept encompassing a program which provides a basic function for a user to operate an information processing apparatus and provides an environment for execution of the "user application." Though the "user application" (in particular, an application program for a game) will mainly be described below by way of example as the "application program," limitation to the "user application" is not intended, and a process of execution of the "system program" may also be encompassed in the technical scope of the invention of the present application.

Though description will be given below with attention being paid to the configuration of the main body apparatus and the input apparatus, the technical concept of the present invention is applicable to a peripheral device which can be used as being separate from the main body apparatus. Examples of such a peripheral device may cover an output apparatus such as a speaker and a display in addition to the input apparatus such as the controller described above.

B. HARDWARE CONFIGURATION OF EACH APPARATUS CONSTITUTING SYSTEM 1

One example of a hardware configuration of each apparatus constituting system 1 according to the present embodiment will now be described.

(b1: Main Body Apparatus 4)

Figure 2:
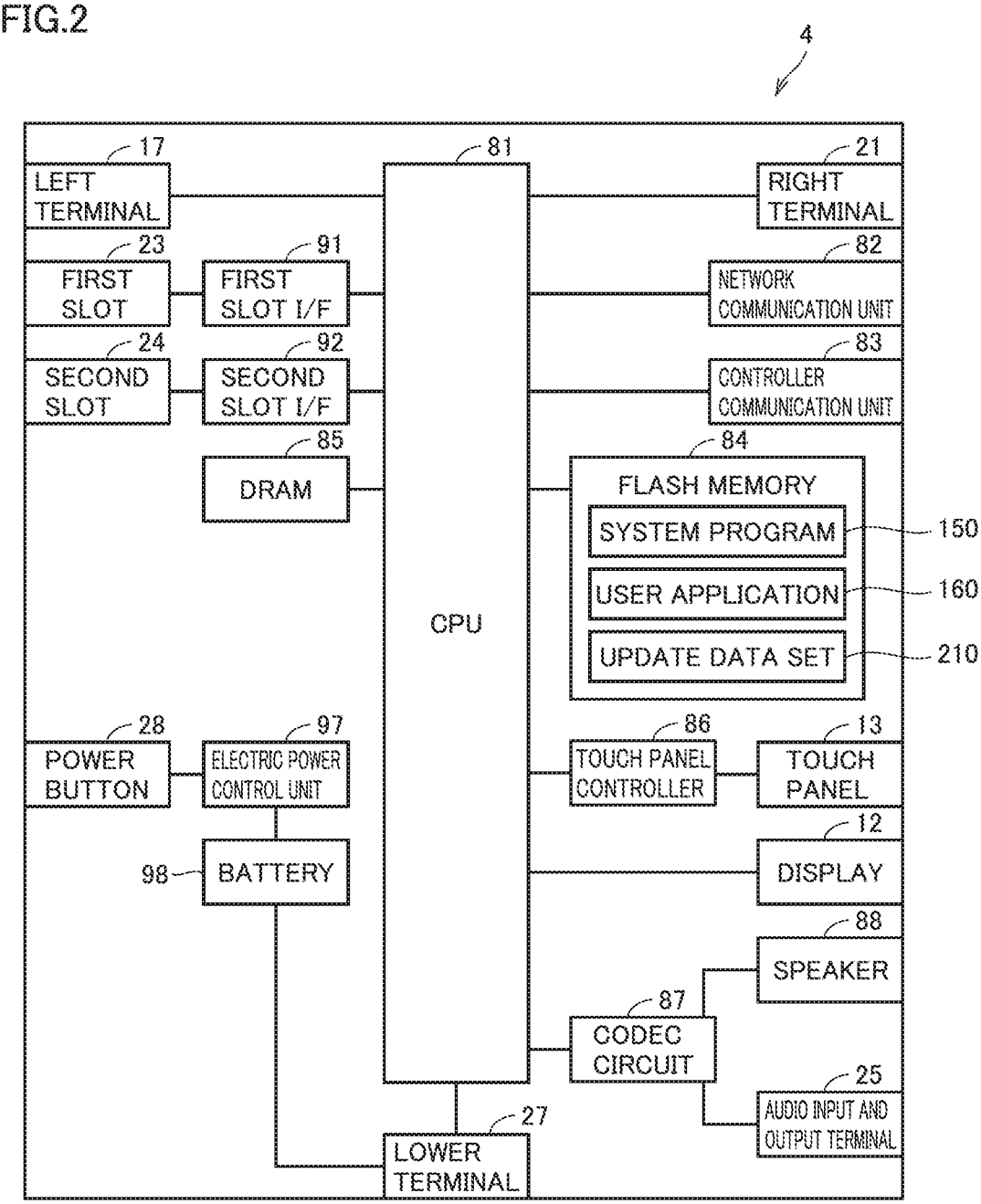
FIG. 2 shows an exemplary illustrative non-limiting drawing illustrating a block diagram of a hardware configuration of a main body apparatus according to the present embodiment.

One example of a hardware configuration of main body apparatus 4 according to the present embodiment will be described with reference to FIG. 2. Components shown in FIG. 2 are accommodated in a housing, for example, as being mounted on an electronic circuit substrate as electronic components.

Main body apparatus 4 includes a central processing unit (CPU) 81 corresponding to an execution module which performs various types of processing including game processing. CPU 81 represents one example of a processor and it reads and executes a program stored in an accessible storage (specifically, an internal storage medium such as a flash memory 84 or an external storage medium attached to a first slot 23 or a second slot 24).

Main body apparatus 4 includes flash memory 84 and a dynamic random access memory (DRAM) 85 by way of example of an embedded storage medium. Flash memory 84 mainly stores in a non-volatile manner, various programs and data to be used in main body apparatus 4. Examples of the programs and data stored in flash memory 84 include a system program 150, a user application 160, and an update data set 210. DRAM 85 temporarily stores various types of data used in execution of a program in CPU 81.

System program 150 plays a role like a kind of an operating system (OS) and provides a basic function in main body apparatus 4 and an environment for execution of a user application. System program 150 corresponds to an information processing program for main body apparatus 4 to perform an information processing method.

Main body apparatus 4 includes a first slot interface (I/F) 91 and a second slot interface 92. The first slot interface is connected to first slot 23 and reads and writes data from and into a first type of storage medium (for example, an SD card) attached to first slot 23. Second slot interface 92 is connected to second slot 24 and reads and writes data from and into a second type of storage medium (for example, a dedicated memory card) attached to second slot 24.

Main body apparatus 4 includes a network communication unit 82 for communicating (specifically, wirelessly) with an external apparatus such as server 200 through network 20 (see FIG. 1). For example, a communication module which has obtained Wi-Fi certification is employed as network communication unit 82, and the network communication unit communicates with an external apparatus through wireless LAN. Network communication unit 82 may also be responsible for communication with another main body apparatus 4 (local communication). Network communication unit 82 provides a wireless communication function for wireless communication with another main body apparatus 4.

In another embodiment, main body apparatus 4 may have a function to connect to and communicate with a mobile communication network (that is, a portable telephone communication network) in addition to (or instead of) a function to connect to and communicate with wireless LAN.

Main body apparatus 4 includes a controller communication unit 83 for wireless communication with left controller 6 and/or right controller 8. Any communication scheme can be adopted for communication between main body apparatus 4 and each controller, and for example, a communication scheme under Bluetooth® standards can be adopted.

CPU 81 is connected to a left terminal 17, a right terminal 21, and a lower terminal 27. CPU 81 transmits and receives data to and from left controller 6 through left terminal 17 when it establishes wired communication with left controller 6. CPU 81 transmits and receives data to and from right controller 8 through right terminal 21 when it establishes wired communication with right controller 8. CPU 81 transmits and receives data to and from a not-shown cradle through lower terminal 27 when it communicates with the cradle.

Main body apparatus 4 includes a touch panel controller 86 for control of a touch panel 13. Touch panel controller 86 generates data indicating a position where a touch input has been given in response to a signal from touch panel 13 and outputs the data to CPU 81.

Display 12 shows an image generated as a result of various types of processing performed by CPU 81 and/or an externally obtained image.

Main body apparatus 4 includes a codec circuit 87 and a speaker 88 (specifically, a left speaker and a right speaker). Codec circuit 87 controls input and output of audio data to and from speaker 88 and an audio input and output terminal 25.

Main body apparatus 4 includes an electric power control unit 97 and a battery 98. Electric power control unit 97 controls supply of electric power from battery 98 to each component based on a command from CPU 81. Electric power control unit 97 controls supply of electric power in response to an input to a power button 28.

When an external charging apparatus (for example, a cradle) is connected to lower terminal 27 and electric power is supplied to main body apparatus 4 through lower terminal 27, battery 98 is charged with supplied electric power. Battery 98 of main body apparatus 4 is preferably higher in charging capacity than a battery of left controller 6 and right controller 8.

(b2: Left Controller 6 and Right Controller 8 (Input Apparatus))

Figure 3:
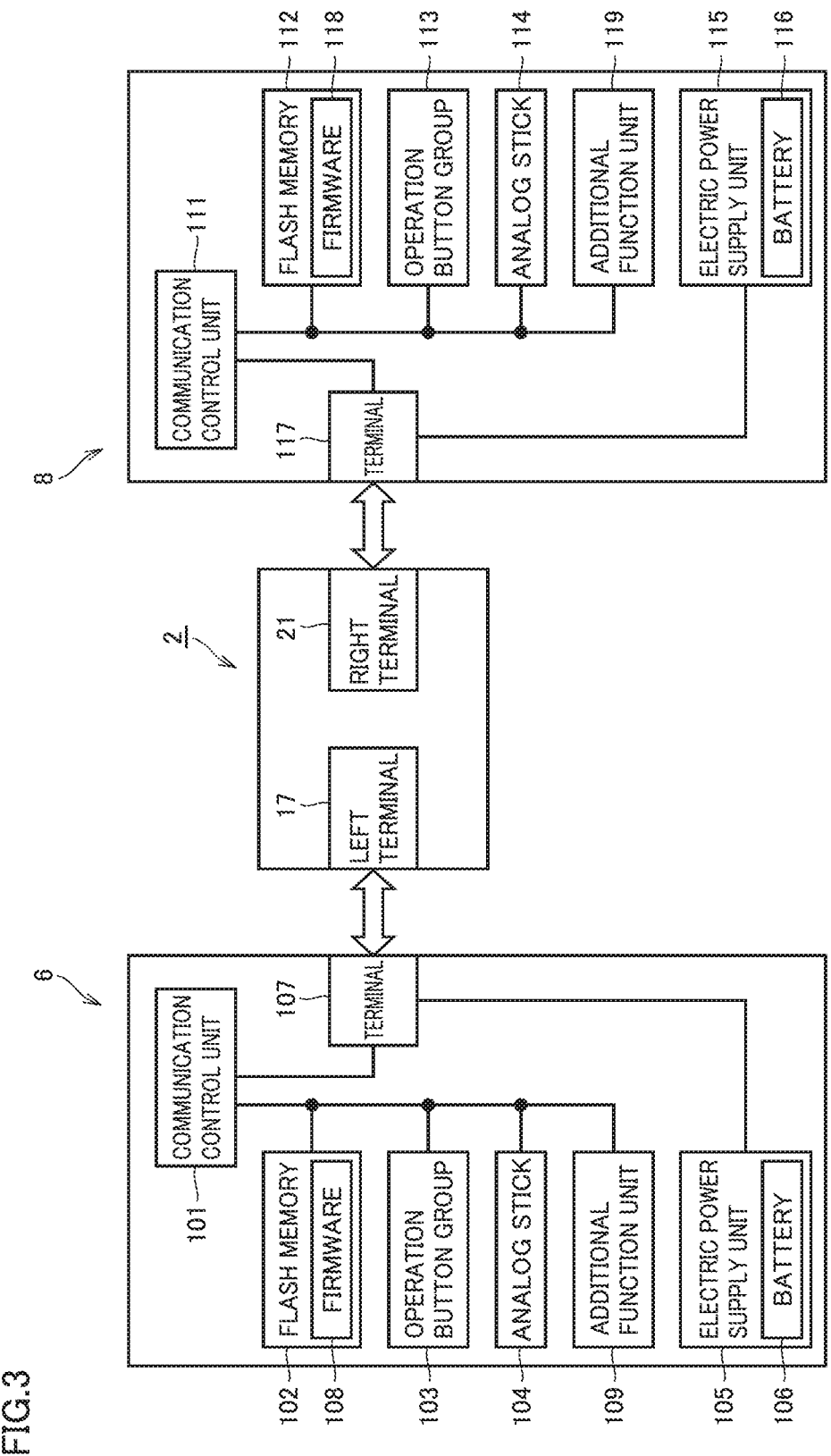
FIG. 3 shows an exemplary illustrative non-limiting drawing illustrating a block diagram showing one example of a hardware configuration of an input apparatus according to the present embodiment.

One example of a hardware configuration of the input apparatus according to the present embodiment will be described with reference to FIG. 3. FIG. 3 also shows components of main body apparatus 4 associated with left controller 6 and right controller 8. The components shown in FIG. 3 are accommodated in the housing, for example, as being mounted on an electronic circuit substrate as electronic components.

Left controller 6 includes a communication control unit 101 which controls left controller 6 as a whole. Communication control unit 101 typically includes a microprocessor and a communication module. Communication control unit 101 supports both of wired communication through a terminal 107 and wireless communication not through terminal 107.

Left controller 6 includes a flash memory 102. Flash memory 102 stores firmware 108, and various types of processing in left controller 6 are performed by execution of firmware 108 by the microprocessor of communication control unit 101.

Left controller 6 includes an operation button group 103 and an analog stick 104. Information indicating an operation by a user performed onto operation button group 103 and analog stick 104 is repeatedly transmitted to communication control unit 101 with a prescribed period.

Various sensors (for example, an acceleration sensor and an angular speed sensor) may further be arranged in left controller 6. In this case, information indicating a value resulting from detection by each sensor is also repeatedly transmitted to communication control unit 101 with a prescribed period.

Left controller 6 further includes an additional function unit 109. Additional function unit 109 includes devices providing various sensing functions, a communication function, and other additional functions in addition to acceptance of an operation by a user.

Examples of additional function unit 109 include a camera for obtaining a still image or a moving image, an infrared (IR) camera which obtains an infrared image, a speaker, a microphone, a near field radio communication (NFC) module which establishes contactless communication, a vibrator which provides vibration to a user, a heat-sensitive device, and a heat generation device. Any device can be adopted for additional function unit 109 without being limited to these devices. Additional function unit 109 may subsequently be mounted.

In order to fully utilize a function provided by additional function unit 109, firmware 108 is assumed to be updated as appropriate.

Left controller 6 includes an electric power supply unit 105 including a battery 106. Electric power supply unit 105 controls supply of electric power to each component in left controller 6. Battery 106 is charged with electric power from main body apparatus 4 through a terminal 107 when left controller 6 is attached to main body apparatus 4.

Right controller 8 is basically similar in configuration to left controller 6 described above. Right controller 8 includes a communication control unit 111, a flash memory 112 which stores firmware 118, an operation button group 113, an analog stick 114, an additional function unit 119, and an electric power supply unit 115 including a battery 116. Since each component of right controller 8 is similar in configuration and function to the corresponding component described in connection with left controller 6, detailed description will not be repeated.

Contents of data output in response to an operation by a user onto operation button group 113 and/or analog stick 114, however, may be different from contents of data output in response to the same operation by the user onto operation button group 103 and/or analog stick 104 in left controller 6. Functions different from each other may be allocated to additional function unit 109 of left controller 6 and additional function unit 119 of right controller 8. Therefore, basically, firmware 108 for controlling each component in left controller 6 and firmware 118 for controlling each component in right controller 8 are provided as being specific to respective controllers. Therefore, update data for firmware is provided also for each controller.

(b3: Accessory Controller 10 (Input Apparatus))

Since accessory controller 10 is similar in configuration and function to left controller 6 and right controller 8 except for a function to communicate with main body apparatus 4 through a terminal, detailed description will not be repeated.

(b4: Server 200)

Server 200 is implemented by any computer. Server 200 includes, for example, a storage which holds update data in accordance with a type or a version of main body apparatus 4 and provides the update data as necessary to main body apparatus 4.

C. UPDATE DATA

Update data provided by server 200 in system 1 according to the present embodiment will now be described.

Figure 4:
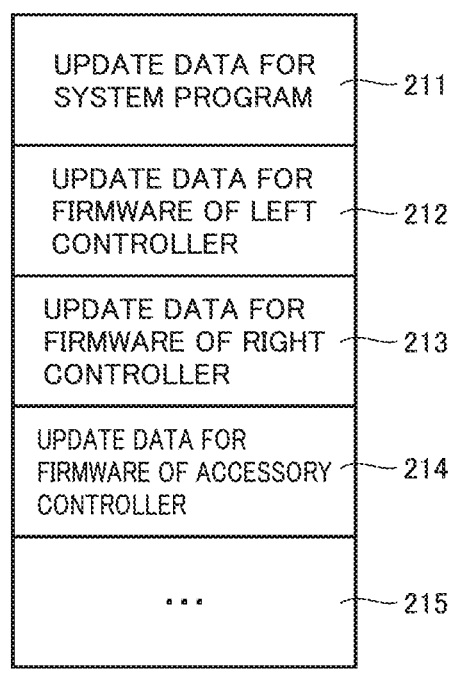
FIG. 4 shows an exemplary illustrative non-limiting drawing illustrating a schematic diagram showing one example of an update data set provided by a server in the system according to the present embodiment.

Referring to FIG. 4, update data set 210 includes update data 211 for the system program which is update data for system program 150 executed in main body apparatus 4.

Update data set 210 further includes update data for firmware of the input apparatus. Update data set 210 includes update data 212 for firmware of left controller 6, update data 213 for firmware of right controller 8, and update data 214 for firmware of accessory controller 10.

Update data set 210 may further include update data 215 for firmware of another input apparatus.

Thus, in system 1 according to the present embodiment, update data for firmware executed in each input apparatus connected to main body apparatus 4 is collectively provided together with update data for system program 150 executed in main body apparatus 4.

As will be described alter, system program 150 of main body apparatus 4 and firmware of each input apparatus are not necessarily concurrently updated, and only partial update data included in the same update data 210 may be applied but remaining update data may not be applied.

Figure 5A:
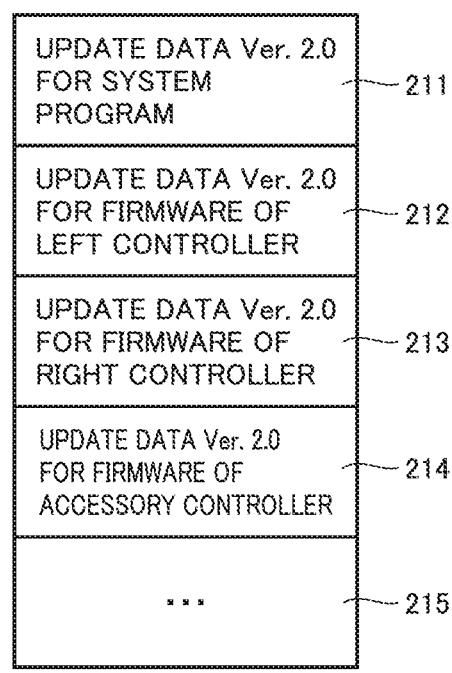
FIGS. 5A to 5C show exemplary illustrative non-limiting drawings illustrating a diagram for illustrating examples of a state of update with the update data set shown in FIG. 4.

One example of a state of update with update data set 210 shown in FIG. 4 will be described with reference to FIGS. 5A to 5C. As shown in FIG. 5A, for example, it is assumed that update data set 210 consisting of "Ver. 2.0" update data is distributed in each case.

Figure 5B:
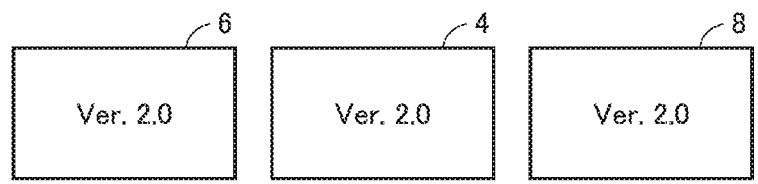

As shown in FIG. 5B, update data included in update data set 210 may be reflected on each of main body apparatus 4 and left controller 6 and right controller 8 (input apparatuses) and update to "Ver. 2.0" may be achieved. As shown in FIG. 5C, on the other hand, though update data is reflected only on main body apparatus 4, update data may not be reflected on left controller 6 and right controller 8 (input apparatuses). In such a case, though main body apparatus 4 alone has been updated to "Ver. 2.0," left controller 6 and right controller 8 (input apparatuses) may remain at "Ver. 1.0" representing a conventional version.

Figure 5C:
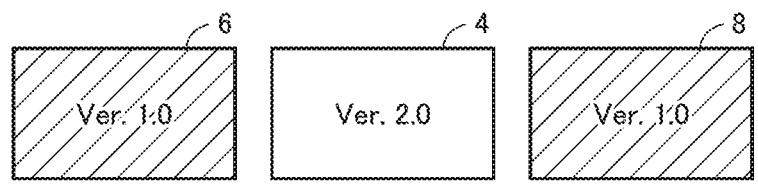

In the example shown in FIG. 5C, latest system program 150 is executed in main body apparatus 4, whereas firmware of the old version is executed in the input apparatuses. Each piece of update data included in update data set 210 is prepared such that basic processing can continue in spite of such variation in state of update.

In system 1 according to the present embodiment, only firmware of the input apparatus can be updated. The firmware of the input apparatus can also be updated as necessary when user application 160 is executed in main body apparatus 4.

Though a method of obtaining update data set 210 from server 200 is mainly exemplified in the present embodiment, limitation thereto is not intended. For example, update data set 210 may be obtained through an external storage medium attached to first slot 23 or second slot 24 (see FIG. 2). In this case, the external storage medium may store a set of any user application 160 and update data set 210 necessary for execution of user application 160.

Though FIG. 4 shows update data set 210 in which update data for the system program of main body apparatus 4 and update data for the firmware of the input apparatus are integrated, limitation thereto is not intended, and each piece of update data may be downloaded each time. By downloading the data each time, load imposed by downloading can be lessened and a storage area of main body apparatus 4 can be prevented from excessively becoming large.

D. OVERVIEW OF PROCESSING FOR UPDATING FIRMWARE OF INPUT APPARATUS

Overview of processing for updating the firmware of the input apparatus in system 1 according to the present embodiment will now be described.

In system 1 according to the present embodiment, the firmware of the input apparatus is updated (1) when it is determined that a condition necessary for the input apparatus is not satisfied while user application 160 is being executed in main body apparatus 4, (2) when system program 150 determines that the firmware of the input apparatus should be updated, and (3) when a user explicitly indicates update of the firmware of the input apparatus.

When system program 150 of main body apparatus 4 is updated, the firmware of the input apparatus may also be updated together. Processing in this case will be described later.

Figure 6:
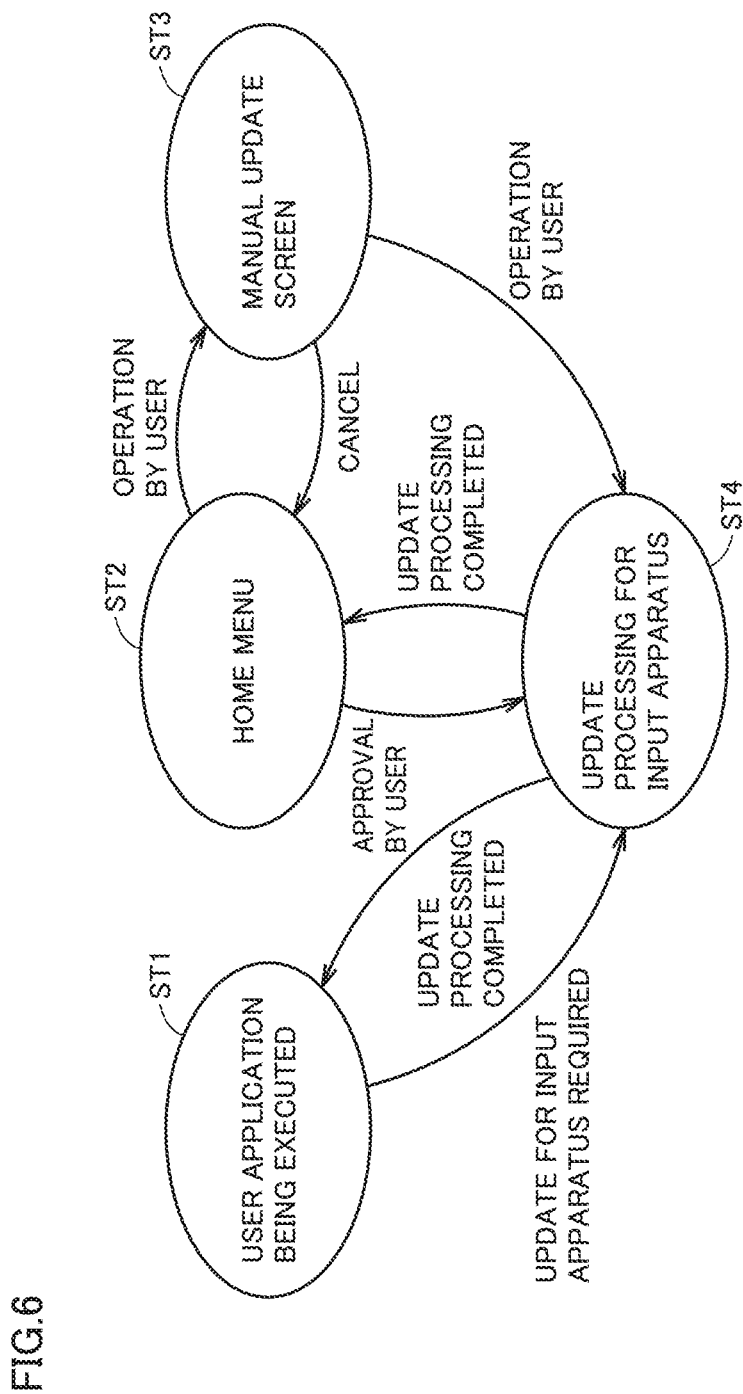
FIG. 6 shows an exemplary illustrative non-limiting drawing illustrating a schematic diagram showing one example of transition of a state associated with processing for updating firmware of the input apparatus in the system according to the present embodiment.

FIG. 6 shows one example of transition of a state associated with processing for updating firmware of the input apparatus in system 1 according to the present embodiment. Referring to FIG. 6, when it is determined that the firmware of the input apparatus should be updated while user application 160 is being executed (a state ST1), execution of user application 160 which is being executed is suspended and processing for updating the firmware of the input apparatus is started (a state ST4). When the processing for updating the firmware of the input apparatus is completed, execution of user application 160 is resumed (state ST1).

"Suspension of execution (of the application program)" herein may encompass not only an example in which processing of the application program itself is stopped but also an example in which progress is temporarily stopped from a point of view of a user. For example, suspension may encompass an example in which when any processing is selected while any application program is executed, the selected processing does not proceed any more unless the firmware of the input apparatus is updated.

When system program 150 determines that the firmware of the connected input apparatus should be updated while a HOME menu is shown (a state ST2), processing for updating the firmware of the input apparatus is started with approval by a user (state ST4). When the processing for updating the firmware of the input apparatus is completed, the screen returns to the original state.

An example in which the firmware of the connected input apparatus should be updated includes an example in which there is a history of failure in processing for updating the firmware of any input apparatus and an example in which the firmware of the connected input apparatus does not satisfy a condition required by system program 150.

After transition to a manual update screen is made in response to an operation by a user from the HOME menu (a state ST3), processing for updating the firmware of the input apparatus is started in response to an operation by the user (state ST4). When the processing for updating the firmware of the input apparatus is completed, the screen returns to the HOME menu.

E. PROCEDURE IN PROCESSING FOR UPDATING FIRMWARE OF INPUT APPARATUS

A procedure in processing for updating the firmware of the input apparatus in system 1 according to the present embodiment will now be described.

(e1: While User Application 160 is being Executed)

A processing procedure corresponding to state ST1 shown in FIG. 6 will initially be described.

Figure 7:
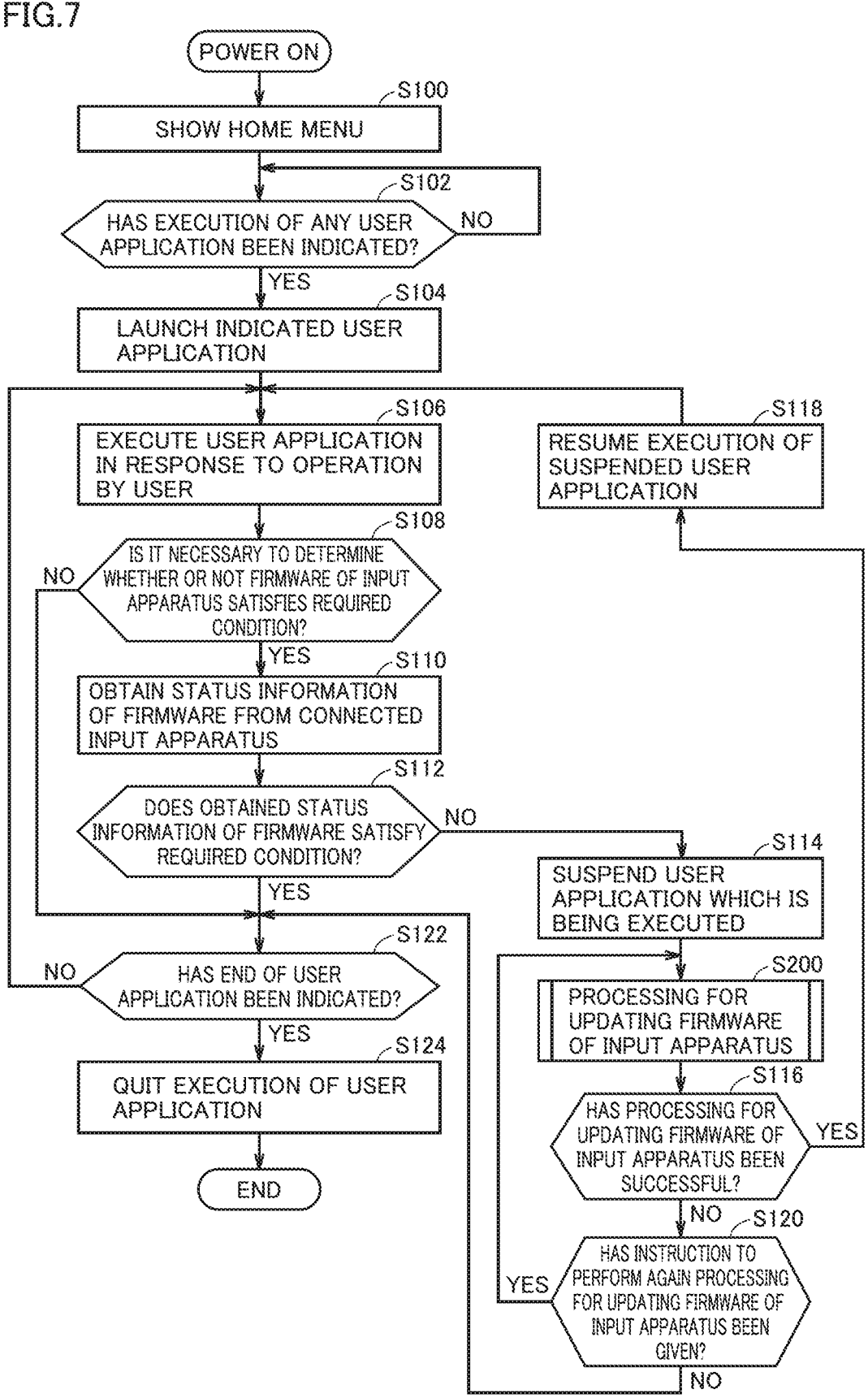
FIG. 7 shows an exemplary illustrative non-limiting flowchart illustrating a processing procedure in updating the firmware of the input apparatus while the main body apparatus according to the present embodiment is executing an application program.

FIG. 7 shows a processing procedure in updating the firmware of the input apparatus while main body apparatus 4 according to the present embodiment is executing user application 160. Each step shown in FIG. 7 is typically implemented by execution of system program 150 and user application 160 by CPU 81 (see FIG. 2) of main body apparatus 4.

Referring to FIG. 7, initially, when power of main body apparatus 4 is turned on, main body apparatus 4 executes system program 150 and shows a HOME menu (step S100). When execution of any user application 160 is indicated in the HOME menu (YES in step S102), main body apparatus 4 launches indicated user application 160 (step S104) and executes user application 160 in response to an operation by a user (step S106). When execution of no user application 160 is indicated (NO in step S102), processing in step S102 is repeated.

When it is not necessary to determine whether or not the firmware of the input apparatus satisfies a required condition while user application 160 is being executed (NO in step S108), the process proceeds to step S122.

In contrast, when it is necessary to determine whether or not the firmware of the input apparatus satisfies a required condition while user application 160 is being executed (YES in step S108), main body apparatus 4 obtains status information (typically, version information) of the firmware of the connected input apparatus (step S110). Version information of the firmware of the input apparatus is obtained in response to a request from user application 160.

A typical form of implementation of obtaining status information of the firmware of the connected input apparatus includes a method of main body apparatus 4 obtaining in advance status information of each piece of firmware when main body apparatus 4 and each input apparatus (left controller 6, right controller 8, and accessory controller 10) establish connection with each other and a method of inquiring of each input apparatus about status information of the firmware from main body apparatus 4. Any method may be adopted in the present embodiment.

In succession, main body apparatus 4 determines whether or not the obtained status information of the firmware satisfies a condition necessary for execution of user application 160 which is being executed (step S112). Whether or not version information of the firmware of the input apparatus satisfies the condition required by user application 160 is determined.

When the obtained status information of the firmware does not satisfy a condition necessary for execution of user application 160 which is being executed (NO in step S112), main body apparatus 4 suspends execution of user application 160 which is being executed (step S114) and performs processing for updating the firmware of the input apparatus (step S200). When the input apparatus does not satisfy the condition necessary for execution of user application 160, the firmware of the input apparatus is updated. Details of the processing for updating the firmware of the input apparatus (step S200) will be described later.

When the processing for updating the firmware of the input apparatus successfully ends (YES in step S116), main body apparatus 4 resumes suspended execution of user application 160 (step S118). The processing in step S106 or later is then repeated.

When the processing for updating the firmware of the input apparatus has not successfully ended (NO in step S116), main body apparatus 4 determines whether or not the user has given an instruction to perform again the processing for updating the firmware of the input apparatus (step S120).

When the user has given an instruction to perform again the processing for updating the firmware of the input apparatus (YES in step S120), main body apparatus 4 performs again the processing in step S200 or later.

In contrast, when the user has not given an instruction to perform again the processing for updating the firmware of the input apparatus (NO in step S120), main body apparatus 4 performs processing in step S122 or later.

Main body apparatus 4 determines in step S122 whether or not end of user application 160 has been indicated (step S122). When end of user application 160 has been indicated (YES in step S122), execution of user application 160 ends (step S124).

When end of user application 160 has not been indicated (NO in step S122), processing in step S106 or later is repeated.

Through the processing above, the firmware of the input apparatus is updated as necessary while user application 160 is being executed.

Though an example in which processing for updating the firmware of the input apparatus is automatically performed unless obtained status information of the firmware satisfies a condition necessary for execution of user application 160 which is being executed is shown in the processing procedure described above, the processing for updating the firmware of the input apparatus may be started only with approval by a user. Alternatively, before start of the processing for updating the firmware of the input apparatus, a user may be notified of start of the updating processing.

Though the processing (steps S112 and S114) for suspending execution of user application 160 when the obtained status information of the firmware does not satisfy a condition necessary for execution of user application 160 which is being executed is exemplified in the processing procedure described above, limitation thereto is not intended. Execution of user application 160 which has previously been executed may be suspended, and then the status information of the firmware of the input apparatus may be obtained.

(e2: Execution from HOME Menu)

A processing procedure corresponding to state ST2 and state ST3 shown in FIG. 6 will now be described.

Figure 8:
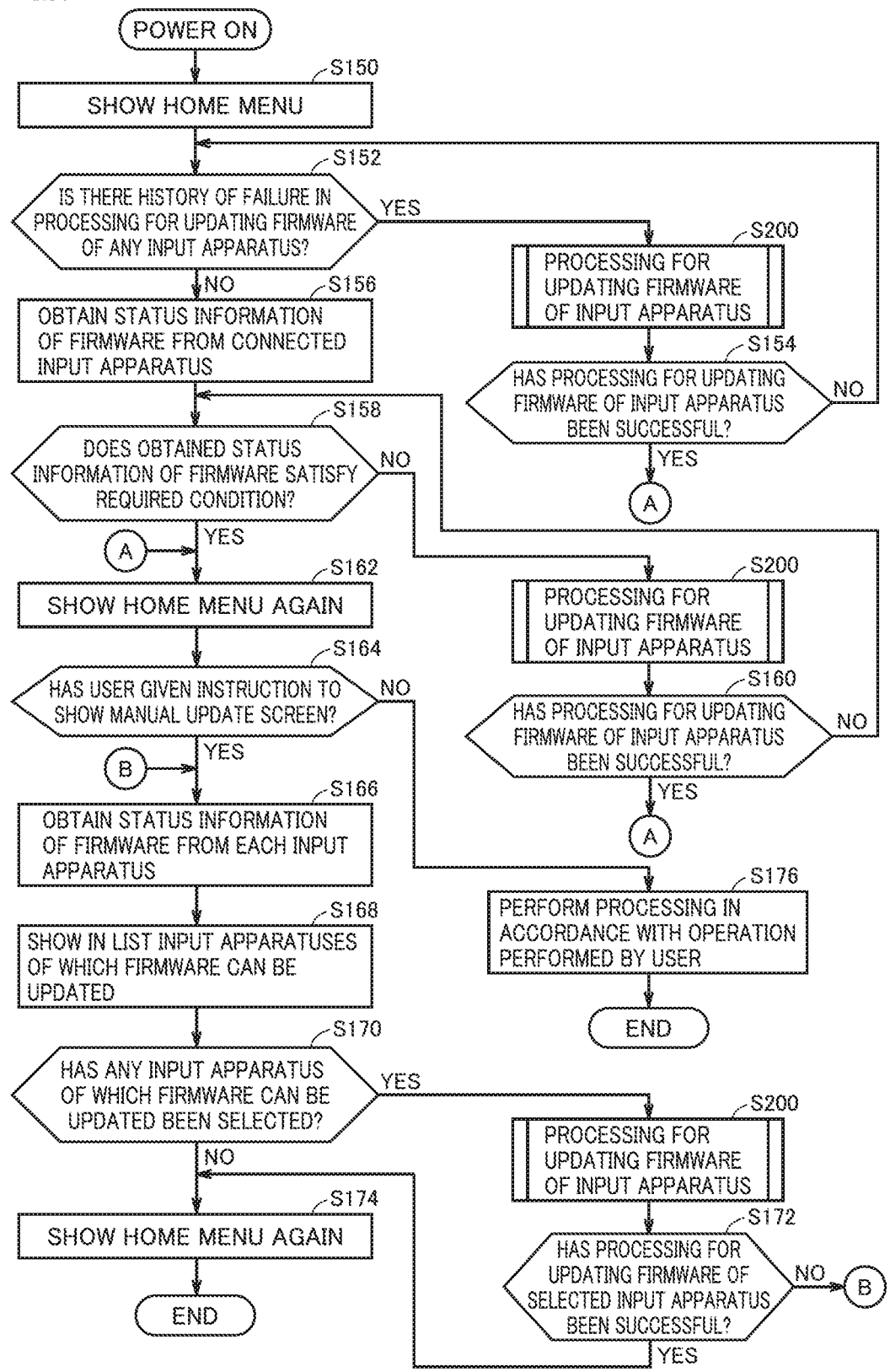
FIG. 8 shows an exemplary illustrative non-limiting flowchart illustrating a processing procedure in performing processing for updating the firmware of the input apparatus while the main body apparatus according to the present embodiment shows a HOME menu screen.

FIG. 8 shows a processing procedure in performing processing for updating the firmware of the input apparatus while main body apparatus 4 according to the present embodiment shows the HOME menu screen. Each step shown in FIG. 8 is typically implemented by execution of system program 150 and user application 160 by CPU 81 (see FIG. 2) of main body apparatus 4.

Referring to FIG. 8, initially, when power of main body apparatus 4 is turned on, main body apparatus 4 executes system program 150 and shows the HOME menu (step S150).

In succession, main body apparatus 4 determines whether or not there is a history of failure in processing for updating firmware of any input apparatus (step S152). When there is a history of failure in processing for updating firmware of any input apparatus (YES in step S152), main body apparatus 4 performs processing for updating the firmware of the input apparatus (step S200). Details of processing for updating the firmware of the input apparatus (step S200) will be described later.

When the processing for updating the firmware of the input apparatus has successfully ended (YES in step S154), main body apparatus 4 shows the HOME menu again (step S162). In contrast, when the processing for updating the firmware of the input apparatus has not successfully ended (NO in step S154), processing in step S152 or later is performed.

In contrast, when there is no history of failure in processing for updating firmware of any input apparatus (NO in step S152), processing in step S156 or later is performed.

Specifically, main body apparatus 4 obtains status information (typically, version information) of the firmware of the connected input apparatus (step S156). Main body apparatus 4 determines whether or not the obtained status information of the firmware satisfies a condition required by system program 150 (step S158).

When the obtained status information of the firmware does not satisfy a condition required by system program 150 (NO in step S158), main body apparatus 4 performs the processing for updating the firmware of the input apparatus (step S200). Details of the processing for updating the firmware of the input apparatus (step S200) will be described later.

When the processing for updating the firmware of the input apparatus has successfully ended (YES in step S160), main body apparatus 4 shows the HOME menu again (step S162). In contrast, when the processing for updating the firmware of the input apparatus has not successfully ended (NO in step S160), processing in step S158 or later is performed.

The processing in steps S156, S158, S200, and S160 may be performed for each connected input apparatus.

In succession, main body apparatus 4 determines whether or not a user has given an instruction to show a manual update screen (step S164). When the user has not given an instruction to show the manual update screen (NO in step S164), main body apparatus 4 performs processing in accordance with an operation performed by the user (step S176).

When the user has given an instruction to show the manual update screen (YES in step S164), main body apparatus 4 obtains status information (typically, version information) of the firmware from each connected input apparatus (step S166). Main body apparatus 4 compares the obtained status information of the firmware with status information of update data for each piece of firmware included in update data set 210 obtained in advance, and shows input apparatuses of which firmware can be updated in a list (step S168). Even when pieces of update data different in version are provided for the same input apparatus, latest update data alone is preferably used. Depending on a situation, however, versions of update data available for each input apparatus may be shown in a list.

When any input apparatus of which firmware can be updated is selected (YES in step S170), main body apparatus 4 performs processing for updating the firmware of the selected input apparatus (step S200). Details of the processing for updating the firmware of the input apparatus (step S200) will be described later.

When the processing for updating the firmware of the selected input apparatus has successfully ended (YES in step S172), main body apparatus 4 shows the HOME menu again (step S174). In contrast, when the processing for updating the firmware of the selected input apparatus has not successfully ended (NO in step S172), the processing in step S166 or later is performed.

When no input apparatus of which firmware can be updated is selected (NO in step S170), the process proceeds to step S174. When there is no input apparatus of which firmware can be updated as well, the process proceeds to step S174.

Through the processing as above, the firmware of the input apparatus is updated as necessary when the HOME menu screen is launched or while the HOME menu screen is shown.

Though an example in which updating processing is automatically started when it is determined that processing for updating the firmware of the input apparatus should be performed is shown in the processing procedure described above, the updating processing may be started only with approval by the user. Alternatively, before start of the updating processing, a user may be notified of start of the updating processing.

(e3: Details of Updating Processing)

Figure 9:
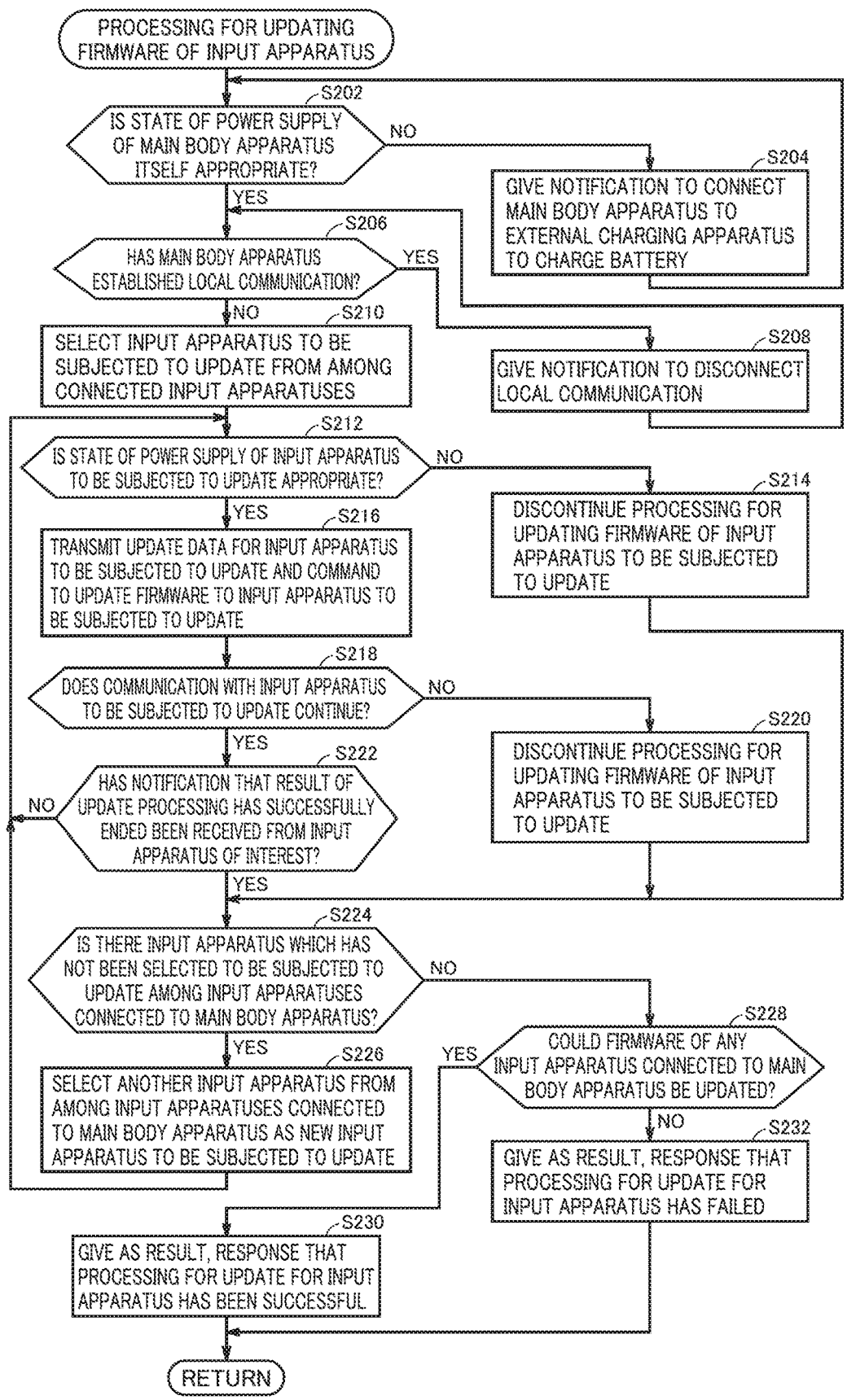
FIG. 9 shows an exemplary illustrative non-limiting flowchart illustrating a detailed processing procedure in the update processing shown in FIGS. 7 and 8.

FIG. 9 shows a detailed processing procedure in the update processing shown in FIGS. 7 and 8. Each step shown in FIG. 9 is typically implemented by execution of system program 150 and user application 160 by CPU 81 (see FIG. 2) of main body apparatus 4.

Referring to FIG. 9, initially, main body apparatus 4 determines whether or not a state of power supply of main body apparatus 4 itself is appropriate (step S202). For example, when a state of charge of battery 98 of main body apparatus 4 is not lower than a predetermined lower limit value (for example, 15%) or when battery 98 of main body apparatus 4 is being charged, the state of power supply is determined as appropriate.

When the state of power supply of main body apparatus 4 itself is not appropriate (NO in step S202), main body apparatus 4 notifies a user to connect main body apparatus 4 to an external charging apparatus to charge the battery (step S204). The processing in step S202 or later is then repeated. When a user gives an instruction to discontinue updating processing in step S204, subsequent processing may be discontinued.

When the state of power supply of main body apparatus 4 itself is appropriate (YES in step S202), main body apparatus 4 determines whether or not local communication has been established (step S206).

When local communication has been established (YES in step S206), main body apparatus 4 notifies the user to disconnect local communication (step S208). Then, the processing in step S206 or later is repeated. When an instruction to discontinue updating processing is received from the user in step S208, subsequent processing may be discontinued.

Thus, when main body apparatus 4 is not wirelessly communicating with another main body apparatus 4, processing for updating the firmware is performed. Through the processing above, determination as to a condition for performing updating processing in main body apparatus 4 ends.

In succession, main body apparatus 4 selects an input apparatus to be subjected to update from among input apparatuses connected to main body apparatus 4 (step S210). When there are a plurality of input apparatuses to be subjected to update, an apparatus to be subjected to update may successively be selected in the order of connection to main body apparatus 4 or the ascending order of the version. Alternatively, a user may select an input apparatus to be subjected to update each time.

Initially, main body apparatus 4 determines whether or not a state of power supply of the input apparatus to be subjected to update is appropriate (step S212). For example, when a state of charge of the battery (battery 106 or battery 116 shown in FIG. 3) of the input apparatus is not lower than a predetermined lower limit value (for example, 15%) or when the battery of the input apparatus is being charged, the state of power supply is determined as appropriate.

When the state of power supply of the input apparatus is not appropriate (NO in step S212), main body apparatus 4 discontinues processing for updating the firmware of the input apparatus of interest (step S214). Then, processing in step S224 is performed.

Instead of discontinuing the processing for updating the firmware of the input apparatus of interest, a user may be notified to connect the input apparatus of interest to an external charging apparatus to charge the battery, and processing for updating the firmware may be continued.

When the state of power supply of the input apparatus is appropriate (YES in step S212), main body apparatus 4 transmits together with update data for the input apparatus of interest, a command to update the firmware with the update data to the input apparatus of interest (step S216). Main body apparatus 4 then determines whether or not communication with the input apparatus of interest continues (step S218).

When communication between main body apparatus 4 and the input apparatus of interest is disconnected (NO in step S218), main body apparatus 4 discontinues the processing for updating the firmware of the input apparatus of interest (step S220). Then, the processing in step S224 is performed.

When the processing for updating the firmware of any input apparatus has failed (when the process reaches step S214 or step S220), the processing for updating the firmware of the input apparatus per se may end at that time point.

When such an implementation is adopted, step S232 is performed after step S214 or step S220.

In contrast, when communication between main body apparatus 4 and the input apparatus of interest continues (YES in step S218), main body apparatus 4 determines whether or not it has received a notification that the updating processing had successfully ended from the input apparatus of interest (step S222).

When a notification that the updating processing had successfully ended has been received from the input apparatus of interest (YES in step S222), main body apparatus 4 performs the processing in step S224.

When the processing for updating the firmware of the input apparatus is completed, the input apparatus may be rebooted.

In contrast, when a notification that the updating processing had successfully ended has not been received from the input apparatus of interest (NO in step S222), main body apparatus 4 determines that updating of the firmware has failed and repeats the processing in step S212 or later. When an instruction to discontinue the updating processing is received from the user in step S222, the processing for updating the firmware of the input apparatus of interest may be discontinued.

Main body apparatus 4 determines in step S224 whether or not there is an input apparatus which has not been selected to be subjected to update from among input apparatuses connected to main body apparatus 4 (step S224).

When there is an input apparatus which has not been selected to be subjected to update (YES in step S224), main body apparatus 4 selects another input apparatus from among the input apparatuses connected to main body apparatus 4 as a new input apparatus to be subjected to update (step S226). Then, the processing in step S212 or later is repeated.

In contrast, when all of the input apparatuses connected to main body apparatus 4 have been selected to be subjected to update (NO in step S224), main body apparatus 4 determines whether or not the firmware of any input apparatus connected to main body apparatus 4 could be updated (step S228).

When the firmware of any input apparatus connected to main body apparatus 4 could be updated (YES in step S228), main body apparatus 4 gives as a result, a response that updating processing has been successful together with information for specifying the input apparatus of which firmware could be updated, and quits the process (step S230). When there is an input apparatus for which update of the firmware has failed, information for specifying the input apparatus for which update of the firmware has failed may together be given.

In contrast, when firmware of none of input apparatuses connected to main body apparatus 4 could be updated (NO in step S228), main body apparatus 4 gives as a result, a response that processing for updating the input apparatus has failed, and quits the process (step S232).

Through the processing procedure as above, processing for updating the firmware of the input apparatus is performed.

When a state of charge of the battery of main body apparatus 4 satisfies a predetermined condition (step S202) and when a state of charge of the battery of the input apparatus satisfies a predetermined condition (step S212) in the processing procedure in the updating processing shown in FIG. 9, the firmware of the input apparatus is updated.

In the processing procedure in the update processing shown in FIG. 9, the processing in steps S210 to S226 is performed for all input apparatuses connected to main body apparatus 4. Therefore, even an input apparatus which is not used with user application 160 which is being executed can be subjected to update of the firmware. In the update processing shown in FIG. 9, processing for updating the firmware of the input apparatus used with user application 160 is performed and processing for updating the firmware of another input apparatus connected to main body apparatus 4 is also performed independently of whether or not the firmware is used with the application program. For example, while there are a controller wirelessly connected to main body apparatus 4 and a controller connected to main body apparatus 4 through a wire, a user may play user application 160 which is being executed not with the controller connected through a wire but with the wirelessly connected controller. Even in such a case, firmware may be updated not only for the wirelessly connected controller but also for the controller connected through a wire.

By adopting such update processing, regardless of use with user application 160 which is being executed, all input apparatuses connected to main body apparatus 4 are subjected to update of the firmware. Therefore, firmware can be updated, for example, also for an input apparatus in which a state of charge of the battery was not sufficient at the time of past update processing or an input apparatus newly added as a result of purchase.

F. FUNCTIONAL CONFIGURATION OF MAIN BODY APPARATUS

Figure 10:
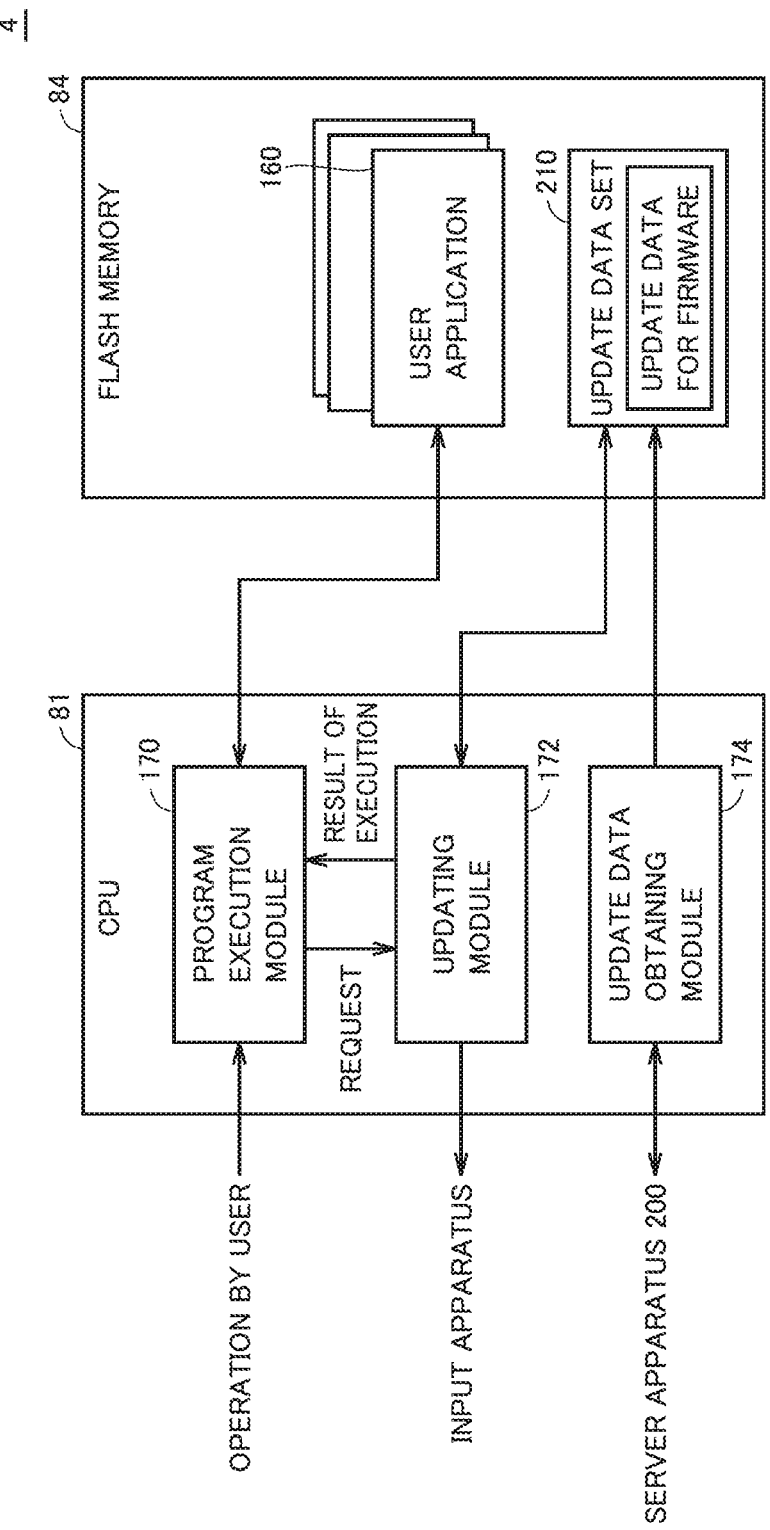
FIG. 10 shows an exemplary illustrative non-limiting drawing illustrating a schematic diagram showing one example of a functional configuration implemented in the main body apparatus according to the present embodiment.

One example of a functional configuration implemented in main body apparatus 4 according to the present embodiment will now be described. FIG. 10 shows one example of a functional configuration implemented in main body apparatus 4 according to the present embodiment. Referring to FIG. 10, a program execution module 170, an updating module 172, and an update data obtaining module 174 are implemented by execution of system program 150 by CPU 81.

Program execution module 170 executes a program in accordance with an operation by a user accepted by the input apparatus. More specifically, program execution module 170 performs processing such as representation of a menu provided by system program 150 or various types of setting in response to an operation by a user, and executes user application 160.

Update data obtaining module 174 obtains update data set 210 from server 200 through network 20 by giving an instruction to network communication unit 82 (see FIG. 2). Update data obtaining module 174 may obtain update data set 210 through a storage medium.

Update data set 210 includes update data for firmware of the input apparatus (update data 212 for firmware of left controller 6, update data 213 for firmware of right controller 8, and update data 214 for firmware of accessory controller 10 shown in FIG. 4).

Updating module 172 performs processing for updating firmware of the input apparatus in response to a request from a program while program execution module 170 is executing the program. Program execution module 170 suspends execution of the program before updating module 172 updates the firmware of the input apparatus and resumes suspended execution of the program in response to completion of update of the firmware of the input apparatus by updating module 172.

G. IMPLEMENTATION OF SOFTWARE IN MAIN BODY APPARATUS

Figure 11A:
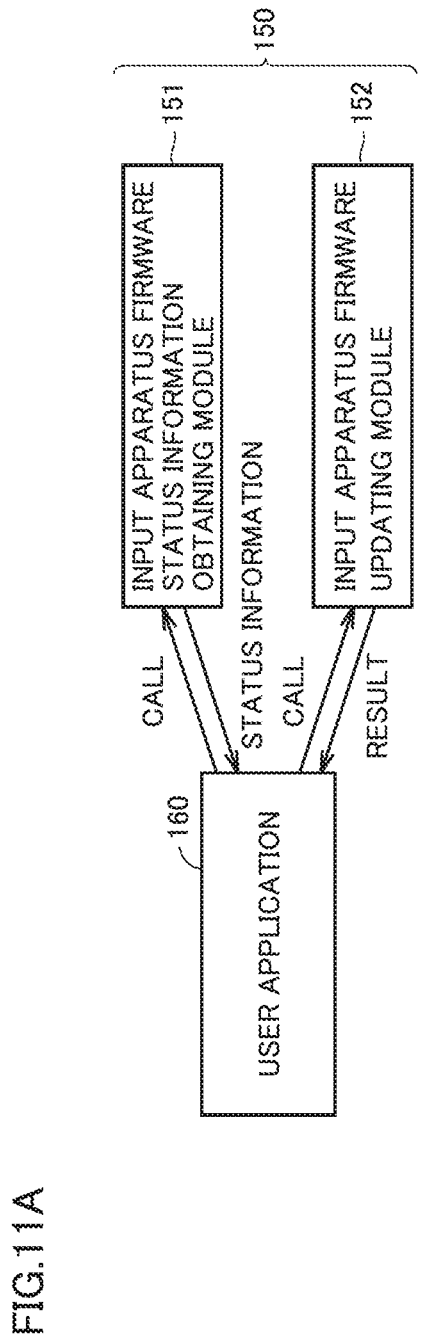
FIGS. 11A to 11C show exemplary illustrative non-limiting drawings illustrating a schematic diagram showing one example of implementation of software in the main body apparatus according to the present embodiment.
Figure 11B:
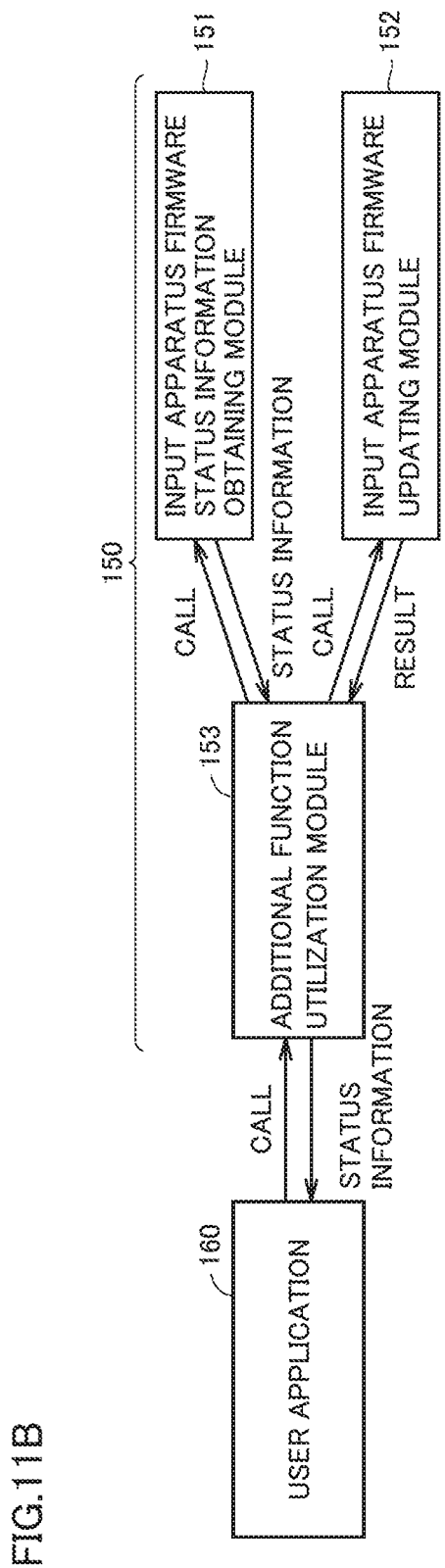
Figure 11C:
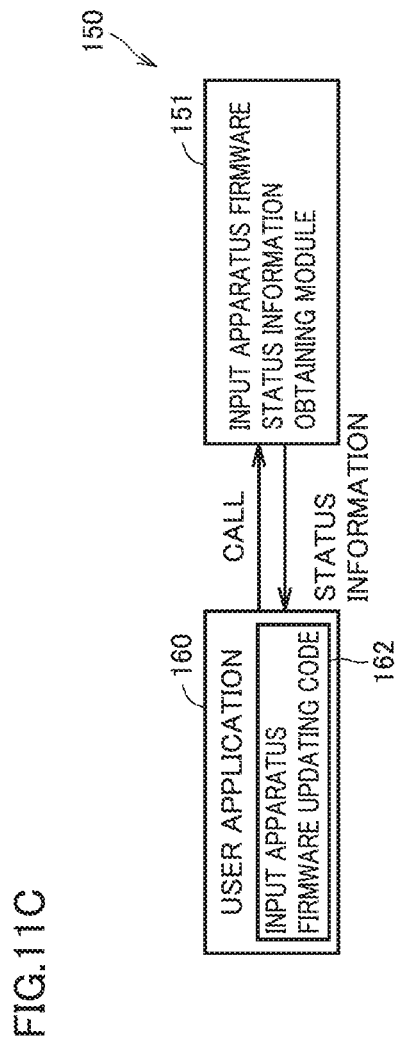

One example of implementation of software in main body apparatus 4 according to the present embodiment will now be described. FIGS. 11A to 11C show examples of implementation of software in main body apparatus 4 according to the present embodiment. FIGS. 11A to 11C show some implementation examples in which processing for updating the firmware of the input apparatus is performed in response to a request from user application 160.

FIG. 11A shows an implementation example in which system program 150 includes an input apparatus firmware status information obtaining module 151 and an input apparatus firmware updating module 152. In this implementation example, user application 160 directly requests for processing for updating the firmware of the input apparatus. More specifically, user application 160 calls input apparatus firmware status information obtaining module 151 before it performs processing on the premise that the firmware of the input apparatus satisfies a required condition, and obtains status information of the firmware of the input apparatus to be subjected to update. Then, when a condition necessary for execution is not satisfied, user application 160 calls input apparatus firmware updating module 152. User application 160 suspends execution of the processing until a response indicating a result is given from input apparatus firmware updating module 152. Input apparatus firmware updating module 152 performs processing for updating the firmware of the input apparatus.

In this implementation example, the processing in steps S110 and S112 shown in FIG. 7 described above is performed by calling input apparatus firmware status information obtaining module 151. The processing in step S200 shown in FIG. 7 described above is performed by calling input apparatus firmware updating module 152.

In the implementation example shown in FIG. 11B, user application 160 indirectly requests for processing for updating the firmware of the input apparatus. More specifically, an example in which system program 150 includes an additional function utilization module 153 for making use of a function provided by additional function unit 109 of left controller 6 and/or additional function unit 119 of right controller 8 is shown. In this case, when user application 160 desires to use additional function unit 109 of left controller 6 and/or additional function unit 119 of right controller 8, additional function utilization module 153 is called.

When additional function utilization module 153 is called by user application 160, it further calls input apparatus firmware status information obtaining module 151 to obtain status information of the firmware of the connected input apparatus. When the obtained status information of the firmware does not satisfy a condition necessary for execution, additional function utilization module 153 calls input apparatus firmware updating module 152. Processing for updating the firmware of the input apparatus is thus performed.

In the implementation example shown in FIG. 11C, processing for updating the firmware of the input apparatus is performed by making use of input apparatus firmware status information obtaining module 151 by issuing a request in user application 160. More specifically, an example in which user application 160 includes an input apparatus firmware updating code 162 is shown. Input apparatus firmware updating code 162 includes a command for performing processing similar to that of input apparatus firmware updating module 152 shown in FIGS. 11A and 11B.

In this implementation example, processing in each step shown in FIG. 7 described above is performed by user application 160. Processing for obtaining status information of the firmware of the connected input apparatus (step S110) is performed by further calling input apparatus firmware status information obtaining module 151.

An application programming interface (API) may be prepared for calling input apparatus firmware status information obtaining module 151, input apparatus firmware updating module 152, and additional function utilization module 153 shown in FIGS. 11A to 11C. In this case, user application 160 and additional function utilization module 153 can call any module through the API.

By thus independently implementing input apparatus firmware status information obtaining module 151, it can be called and used by any of user application 160 and additional function utilization module 153. The API for giving a response about version information of the firmware of the input apparatus is prepared in main body apparatus 4. A degree of freedom in implementing user application 160 which makes use of processing for updating the firmware of the input apparatus according to the present embodiment can thus be enhanced.

Though FIG. 11A shows an example in which input apparatus firmware status information obtaining module 151 and input apparatus firmware updating module 152 are independently implemented, these modules may be integrated.

When the obtained status information of the firmware does not satisfy a required condition, input apparatus firmware status information obtaining module 151 shown in FIGS. 11A to 11C may further call input apparatus firmware updating module 152.

As described above, any configuration can be adopted for an implementation example in which user application 160 issues a request for performing processing for updating firmware of the input apparatus.

H. PROCESSING PROCEDURE IN UPDATING SYSTEM PROGRAM OF MAIN BODY APPARATUS 4

One example of a processing procedure in updating the system program in main body apparatus 4 will now be described.

FIG. 12 shows a processing procedure when main body apparatus 4 according to the present embodiment updates the system program. Each step shown in FIG. 12 is typically implemented by execution of system program 150 by CPU 81 (see FIG. 2) of main body apparatus 4.

Referring to FIG. 12, for example, when execution of any user application 160 is indicated in the HOME menu (YES in step S300), main body apparatus 4 obtains status information (typically, version information) of system program 150 (step S302) and determines whether or not the obtained status information of the system program satisfies a condition required by indicated user application 160 (step S304).

When the obtained status information of the system program satisfies the condition required by indicated user application 160 (YES in step S304), main body apparatus 4 launches indicated user application 160 (step S306) and executes user application 160 in response to an operation by a user (step S308). Then, the process ends.

In contrast, when the obtained status information of the system program does not satisfy the condition required by indicated user application 160 (NO in step S304), main body apparatus 4 determines whether or not update data set 210 which satisfies the condition has already been stored in flash memory 84 (step S310).

When update data set 210 satisfying the condition has not been stored in flash memory 84 (NO in step S310), main body apparatus 4 obtains latest update data set 210 from server 200 and stores the update data set in flash memory 84 (step S312).

In succession, main body apparatus 4 updates system program 150 with update data 211 for the system program included in update data set 210 (step S314). When processing for updating system program 150 of main body apparatus 4 is completed, main body apparatus 4 may be rebooted.

Thus, in main body apparatus 4, version information of system program 150 of main body apparatus 4 is obtained with execution of user application 160, and when the version information of system program 150 of main body apparatus 4 does not satisfy the condition necessary for execution of user application 160, system program 150 of main body apparatus 4 is updated. Though a processing example in which version information of system program 150 is obtained before execution of user application 160 is shown in the description above, limitation thereto is not intended. User application 160 may be executed, and version information of system program 150 may be checked, for example, during processing for initializing user application 160.

Main body apparatus 4 performs processing for updating firmware of the input apparatus (step S200), because it is assumed that update also of firmware of the input apparatus is often necessary. When processing for updating the firmware of the input apparatus is completed, processing in step S306 or later is performed.

Thus, in main body apparatus 4, in updating system program 150 of main body apparatus 4, firmware of the input apparatus connected to main body apparatus 4 is also updated. Processing for updating system program 150 of main body apparatus 4 and processing for updating firmware of the input apparatus connected to main body apparatus 4, however, may be performed independently of each other. Even when system program 150 of main body apparatus 4 is updated, firmware of the input apparatus does not have to be updated.

The processing procedure shown in FIG. 12 is by way of example, and the processing for updating the system program may be performed in main body apparatus 4 also when another condition is satisfied. In this case as well, processing for updating the firmware of the input apparatus may be performed together.

I. OTHER EMBODIMENTS

A configuration as below may be adopted in addition to the embodiment described above.

(i1: Memory Bank in Update)

In the processing for updating firmware as described above, even though update fails, a function of the apparatus should be maintained. Therefore, for example, at least two areas (banks) which can store the entire firmware are prepared in the flash memory, and in update, one bank maintains yet-to-be updated firmware and the other bank stores updated firmware. When storage of the updated firmware in the other bank is successful, updated firmware can be executed by switching between banks from which firmware is to be read at the time of reboot.

When a capacity of the flash memory is restricted and insufficient for preparation of two banks, for example, the firmware may be divided into a portion of a basic function and a portion of an expanded function and two banks may be prepared only for the former.

In the case of the controller described above, for example, a function to accept an operation by a user and a function to transmit the accepted operation by the user to main body apparatus 4 belong to the basic function. A function to use additional function units 109 and 119 belongs to the expanded function.

By doing so, even though update of the firmware fails, the basic function is maintained and hence processing for updating the firmware can be performed again.

(i2: Prevention of Failure in Update)

In order to prevent failure in processing for updating the firmware as described above, other processing which affects the updating processing may be restricted.

For example, transition of main body apparatus 4 to a sleep mode may be prohibited or a power supply menu or power button 28 may be deactivated. Alternatively, processing for deactivating wireless communication such as an airplane mode may be prohibited.

Without being limited to the processing as described above, the possibility of failure in update of firmware of the input apparatus and the system program of main body apparatus 4 in response to an operation by a user is preferably lowered.

(i3: Function to Support Setting in Using Controller)

In game device 2 according to the present embodiment, a plurality of controllers can be used in different fashions. Therefore, when any application is executed, such a setting support function as giving a notification about a type or a manner of a controller which can be used may be provided to a user. In performing such a function to support setting in using a controller, processing for updating the firmware of the input apparatus as described above may be performed.

Figure 13:
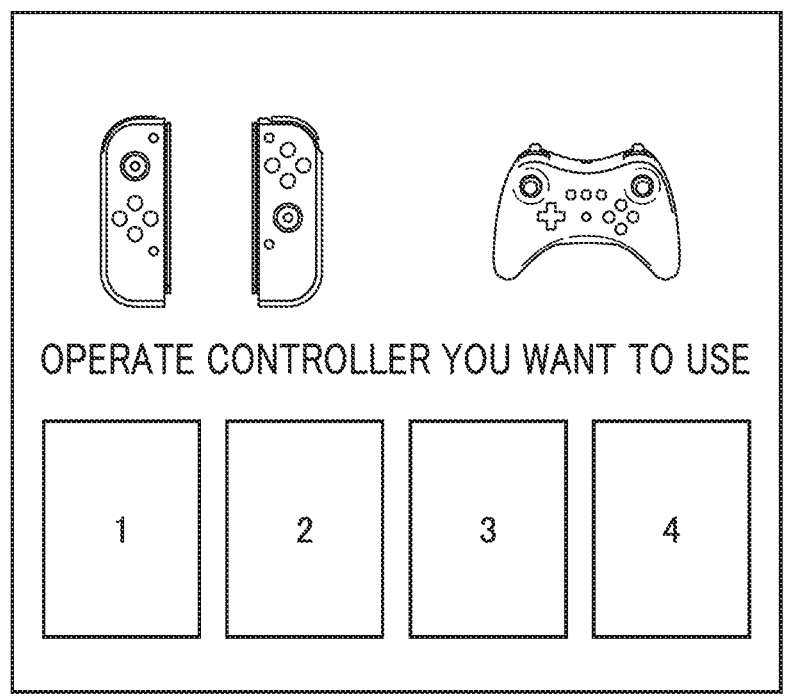
FIG. 13 shows an exemplary illustrative non-limiting drawing illustrating a schematic diagram showing one example of a setting support screen in using a controller provided by a game device according to the present embodiment.

FIG. 13 shows one example of a setting support screen in using a controller provided by game device 2 according to the present embodiment. The setting support screen shown in FIG. 13 is called from an application program which is being executed. In such a setting support screen, a user determines in which fashion a controller is to be used. A form of use of a selectable controller may visually be shown.

When the user decides on a controller to be used or a manner of use in such a setting support screen, status information of the firmware of the connected input apparatus may be checked and processing for updating the firmware of the input apparatus (see FIG. 9) may be performed as necessary.

As described with reference to FIG. 9 above, an attempt to perform processing for updating firmware is made not only for an input apparatus (controller) actually used with the application program which is being executed but also for all input apparatuses connected to main body apparatus 4. The firmware of the input apparatus which can be used can thus be maintained in a more appropriate state.

J. ADVANTAGES

According to game device 2 including main body apparatus 4 and one controller or a plurality of controllers according to the present embodiment, while a user is playing an application program for a game, whether or not firmware of the controller should be updated is determined in accordance with a request on a side of the application program. Therefore, for example, even in such a situation that firmware of the controller has not been updated in spite of system program 150 of main body apparatus 4 having been updated, the user does not have to determine whether or not to update the firmware of each individual controller. Since updating processing is performed as appropriate in accordance with a game which is actually played, the user does not have to be conscious about whether or not firmware of the controller which the user himself/herself uses is sufficiently new.

According to game device 2 including main body apparatus 4 and one controller or a plurality of controllers according to the present embodiment, execution of an application program for a game is once suspended at the time point of issuance of a request from the application program and then firmware of the controller is updated. When update of the firmware of the controller is completed, the game can be resumed from a point of suspension. Therefore, the user does not feel inconvenience and usability can be enhanced.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. An information processing apparatus to which an input apparatus is connected through a wire or wirelessly, the input apparatus of a type that uses firmware of the input apparatus, the information processing apparatus comprising:
    a memory; and
    a processor coupled to the memory,
    the processor being configured to perform operations comprising
        execute a game application program in accordance with an operation by a user accepted by the input apparatus,
        obtain version information of the firmware of the input apparatus in response to a request from the game application program,
        obtain update data for the firmware of the input apparatus from a server through a network and store in the memory the obtained update data for the firmware of the input apparatus;
        determine in response to the obtained version information whether the firmware of the input apparatus should be updated; and
        in response to determining the firmware of the input apparatus should be updated, perform processing for updating the firmware of the input apparatus based on the update data for the firmware of the input apparatus stored in the memory in response to a request from the game application program while the game application program is being executed,
    the processor being further configured to suspend execution of the game application program before update of the firmware of the input apparatus, determine when update of the firmware of the input apparatus has been completed, and resume execution of the game application program in response to completion of update of the firmware of the input apparatus.

2. The information processing apparatus according to claim 1, wherein
    the processor is configured to determine whether the version information of the firmware of the input apparatus satisfies a condition required by the game application program.

3. The information processing apparatus according to claim 1, the information processing apparatus further comprising an application programming interface (API) which gives a response about the version information of the firmware of the input apparatus.

4. The information processing apparatus according to claim 1, wherein
    the processor is configured to obtain update data for the firmware of the input apparatus together with update data for a system program of the information processing apparatus.

5. The information processing apparatus according to claim 4, wherein
    the processor is configured to perform also processing for updating the firmware of the input apparatus connected to the information processing apparatus when processing for updating the system program of the information processing apparatus is performed.

6. The information processing apparatus according to claim 5, wherein
    the processor is configured to obtain version information of the system program of the information processing apparatus in response to execution of the game application program, and when the version information of the system program of the information processing apparatus does not satisfy a condition necessary for execution of the game application program, the processor is configured to perform processing for updating the system program of the information processing apparatus.

7. The information processing apparatus according to claim 1, the information processing apparatus further comprising a wireless communication unit configured to wirelessly communicate with another information processing apparatus, wherein
    when the information processing apparatus is not wirelessly communicating with the another information processing apparatus, the processor is configured to perform processing for updating the firmware.

8. The information processing apparatus according to claim 1, wherein
    when a state of charge of a battery of the information processing apparatus satisfies a predetermined condition and when a state of charge of a battery of the input apparatus satisfies a predetermined condition, the processor is configured to perform processing for updating the firmware of the input apparatus.

9. The information processing apparatus according to claim 1, wherein
    the information processing apparatus is configured so that a plurality of input apparatuses can be connected through a wire or wirelessly to the information processing apparatus, and
    the processor is configured to perform processing for updating the firmware of the input apparatus used with the game application program and perform processing for updating also firmware of another input apparatus connected to the information processing apparatus independently of whether the firmware is used with the game application program.

10. The information processing apparatus of claim 1 wherein the processor is configured to perform processing for updating the firmware of the input apparatus in response to a user's approval to update the firmware through a manual update screen.

11. The information processing apparatus of claim 1 wherein the input apparatus comprises a separate wireless handheld controller, and performing processing for updating the firmware of the input apparatus comprises updating the separate wireless handheld controller firmware over a wireless connection.

12. An information processing system comprising:
an input apparatus that uses firmware of the input apparatus; and
an information processing apparatus to which the input apparatus is connected through a wire or wirelessly,
the information processing apparatus including
a memory, and
a processor coupled to the memory,
the processor being configured to perform operations comprising:
  execute a game application program in accordance with an operation by a user accepted by the input apparatus;
  obtain update data for firmware of the input apparatus from a server through a network;
  determine whether the firmware of the input apparatus should be updated; and
  in response to determining the firmware of the input apparatus should be updated, perform processing for updating the firmware of the input apparatus in response to a request from the game application program while the game application program is being executed; and
the processor being further configured to suspend execution of the game application program before update of the firmware, determine when update of the firmware of the input apparatus has been completed, and resume execution of the game application program in response to completion of update of the firmware of the input apparatus.

13. The information processing system of claim 12 wherein the processor is further configured to condition updating the firmware of the input apparatus on a user's approval to update the firmware through a manual update screen.

14. The information processing system of claim 12 wherein the input apparatus comprises a separate wireless handheld controller, and performing processing for updating the firmware of the input apparatus comprises updating the separate wireless handheld controller firmware over a wireless connection.

15. An information processing method performed in an information processing apparatus to which an input apparatus which uses firmware of the input apparatus is connected through a wire or wirelessly, the method comprising:
  executing a game application program in accordance with an operation by a user accepted by the input apparatus;
  obtaining version information of the firmware of the input apparatus in response to a request from the game application program;
  obtaining update data for firmware of the input apparatus from a server through a network and store the obtained update data in the memory;
  determine in response to the obtained version information whether the firmware of the input apparatus should be updated;
  in response to determining the firmware of the input apparatus should be updated, performing processing for updating the firmware of the input apparatus in response to a request from the game application program while the game application program is being executed;
  suspending execution of the game application program before update of the firmware of the input apparatus;
  determining when update of the firmware of the input apparatus has been completed; and
  resuming execution of the game application program in response to completion of update of the firmware of the input apparatus.

16. The method of claim 15 further including conditioning updating the firmware of the input apparatus on a user's approval to update the firmware through a manual update screen.

17. The method of claim 15 further including updating firmware of the input device comprising a separate wireless handheld controller over a wireless connection.

18. A non-transitory computer-readable storage medium with an executable information processing program stored thereon, the information processing program being executed by a computer to which an input apparatus that uses firmware is connected through a wire or wirelessly, the information processing program causing the computer to perform operations comprising:
  obtaining update data for firmware of the input apparatus from a server through a network;
  obtaining version information of the firmware of the input apparatus in response to a request from the game application program;
  determining in response to the obtained version information whether the firmware of the input apparatus should be updated;
  in response to determining the firmware of the input apparatus should be updated, performing processing for updating the firmware of the input apparatus in response to a request from a game application program while the application program is being executed in accordance with an operation by a user accepted by the input apparatus;
  suspending execution of the game application program before update of the firmware of the input apparatus;
  determining when update of the firmware of the input apparatus has been completed; and
  resuming execution of the game application program in response to completion of update of the firmware of the input apparatus.

19. The storage medium of claim 18 wherein the information processing program further causes the computer to condition performing the processing for updating the firmware of the input apparatus on a user's approval through a manual update screen to update the input device firmware.

20. The storage medium of claim 18 wherein the input apparatus comprises a separate wireless handheld controller, and performing processing for updating the firmware of the input apparatus comprises updating the separate wireless handheld controller firmware over a wireless connection.

* * * * *